(12) United States Patent
Ito

(10) Patent No.: US 11,593,620 B2
(45) Date of Patent: Feb. 28, 2023

(54) TRAINING PROGRAM, TRAINING METHOD, AND INFORMATION PROCESSING APPARATUS

(71) Applicant: FUJITSU LIMITED, Kawasaki (JP)

(72) Inventor: Makiko Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 671 days.

(21) Appl. No.: 16/666,470

(22) Filed: Oct. 29, 2019

(65) Prior Publication Data

US 2020/0143232 A1    May 7, 2020

(30) Foreign Application Priority Data

Nov. 7, 2018  (JP) .............................. JP2018-209415

(51) Int. Cl.
*G06N 20/20* (2019.01)
*G06N 3/04* (2023.01)
(Continued)

(52) U.S. Cl.
CPC ........... *G06N 3/0472* (2013.01); *G06F 7/483* (2013.01); *G06N 3/084* (2013.01); *G06F 2207/4824* (2013.01)

(58) Field of Classification Search
CPC ...... G06N 3/088; G06N 3/0444; G06N 3/084; G06N 20/20; G06T 9/002
(Continued)

(56) References Cited

U.S. PATENT DOCUMENTS

| | | | |
|---|---|---|---|
| 2017/0316307 A1 | 11/2017 | Koster et al. | |
| 2019/0130276 A1* | 5/2019 | Shiring | G06N 3/084 |
| 2021/0406649 A1* | 12/2021 | Zhang | G06F 7/499 |

FOREIGN PATENT DOCUMENTS

| | | |
|---|---|---|
| JP | 07-084975 | 3/1995 |
| JP | 2009-271598 | 11/2009 |

(Continued)

OTHER PUBLICATIONS

Williamson, Darrell, "Dynamically Scaled Fixed Point Arithmetic", May 10, 1991, pp. 315-318, IEEE Pacific Rim Conference on Communications, Computers and Signal Processing, XP055558632.

(Continued)

*Primary Examiner* — Gordon G Liu
(74) *Attorney, Agent, or Firm* — Fujitsu Patent Center

(57) ABSTRACT

An information processing apparatus that performs deep learning using a neural network includes a memory, and an arithmetic processing device that performs a process for layers of the neural network in a predetermined direction. The process for the layers includes: pre-determining a decimal point position of a fixed-point number of an intermediate data obtained by an operation of each of the layers; performing the arithmetic operation for each layer with the pre-determined decimal point position to obtain the intermediate data and acquiring first statistical information of a distribution of bits of the intermediate data; determining a decimal point position of the intermediate data based on the statistical information; and performing the arithmetic operation for each layer with the determined decimal point position again when the difference of the determined decimal point position and the pre-determined decimal point position is greater than a threshold value.

4 Claims, 25 Drawing Sheets

(51) Int. Cl.
*G06F 7/483* (2006.01)
*G06N 3/084* (2023.01)

(58) Field of Classification Search
USPC .......................................................... 706/25
See application file for complete search history.

(56) References Cited

FOREIGN PATENT DOCUMENTS

| JP | 2012-203566 | 10/2012 |
| JP | 2015-007820 | 1/2015 |
| JP | 2018-124681 | 8/2018 |

OTHER PUBLICATIONS

Extended European Search Report dated Apr. 23, 2020 for corresponding European Patent Application No. 19206327.9, 11 pages.

* cited by examiner

INPUT (INTERMEDIATE DATA) : in (Nbit=40bit)

in[N-1] SIGN BIT
in[0]

OUTPUT (STATISTICAL INFORMATION (BIT PATTERN BP)) : out (Nbit=40bit)

| input ||||||| output(BP) |
| in[39] | in[38] | in[37] | in[36] | ... | in[1] | in[0] | out |
|---|---|---|---|---|---|---|---|
| 0 | 0 | 0 | 0 | ... | 0 | 0 | 0x8000000000 |
| 1 | 1 | 1 | 1 | ... | 1 | 1 | 0x8000000000 |
| 0 | 1 | b | b | ... | b | b | 0x4000000000 |
| 1 | 0 | b | b | ... | b | b | 0x4000000000 |
| 0 | 0 | 1 | b | ... | b | b | 0x2000000000 |
| 1 | 1 | 0 | b | ... | b | b | 0x2000000000 |
| 0 | 0 | 0 | 1 | ... | b | b | 0x1000000000 |
| 1 | 1 | 1 | 0 | ... | b | b | 0x1000000000 |
| ... | ... | ... | ... | ... | ... | ... | ... |
| 0 | 0 | 0 | 0 | ... | 1 | b | 0x0000000002 |
| 1 | 1 | 1 | 1 | ... | 0 | b | 0x0000000002 |
| 0 | 0 | 0 | 0 | ... | 0 | 1 | 0x0000000001 |
| 1 | 1 | 1 | 1 | ... | 1 | 0 | 0x0000000001 |

FIG. 22
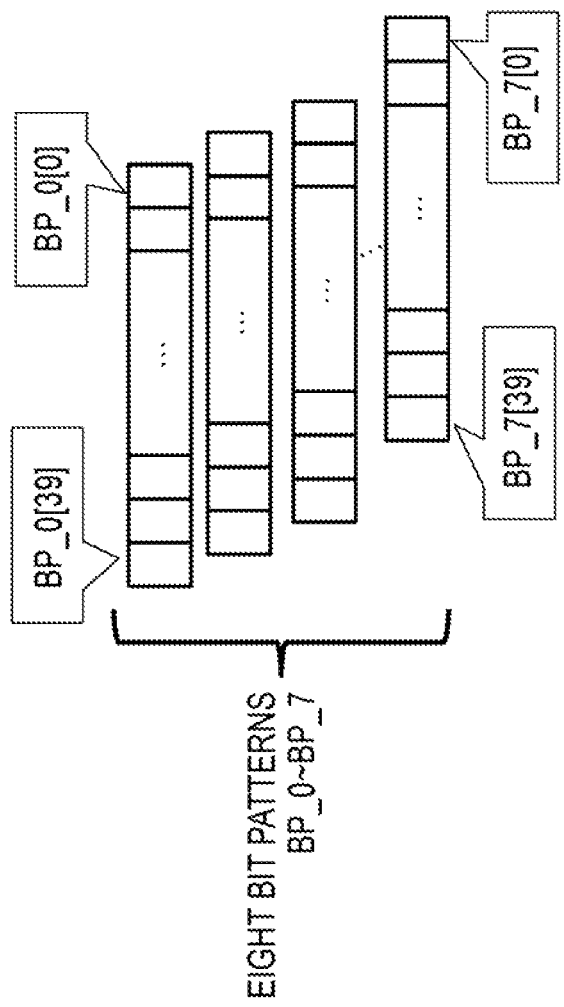
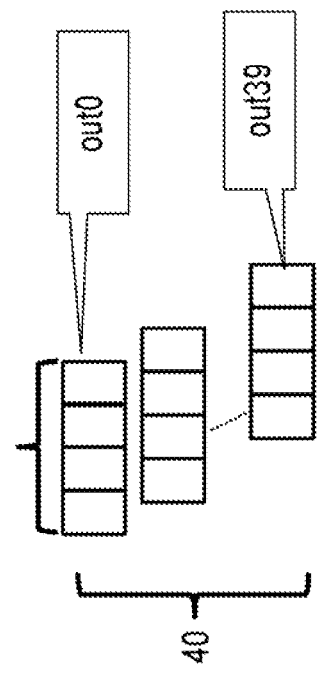

TRAINING PROGRAM, TRAINING METHOD, AND INFORMATION PROCESSING APPARATUS

CROSS-REFERENCE TO RELATED APPLICATION

This application is based upon and claims the benefit of priority of the prior Japanese Patent Application No. 2018-209415, filed on Nov. 7, 2018, the entire contents of which are incorporated herein by reference.

FIELD

The present invention relates to a training program, a training method, and an information processing apparatus.

BACKGROUND

Deep learning (hereinafter referred to as DL) is machine learning using a multilayer neural network. A deep neural network (hereinafter referred to as DNN), which is an example of deep learning, is a network in which an input layer, a plurality of hidden layers, and an output layer are arranged in order. Each layer has one or more nodes, and each node has a value. A node in one layer and a node in the next layer are connected by edges between the nodes, and each edge has a variable (or parameter) such as a weight or a bias.

In the DNN, the value of a node in each layer is obtained by a predetermined operation based on the values of nodes in the previous layer, the weights of the edges between the nodes, and the like. When input data is input to the nodes in the input layer, the values of the nodes in the next layer is obtained by a predetermined operation, and further, the values of the nodes in the following layer are obtained using, as an input, the data obtained by the above operation by a predetermined operation for the following layer. Then, the value of the node in the output layer, which is the final layer, becomes output data for the input data.

A DNN processor for performing an arithmetic operation for DNN may use a fixed-point arithmetic unit to perform the arithmetic operation because image data, which is one object to be processed by the operation, has a relatively small number of bits. This makes it possible to reduce the power consumption required for the arithmetic operation because no floating-point arithmetic unit is used. In addition, using a fixed-point arithmetic unit having simpler circuitry than a floating-point arithmetic unit means that the DNN processor can be provided with a smaller circuit scale.

However, since the number of bits of a fixed-point number is fixed, the dynamic range is narrower than that of a floating-point number. For this reason, an overflow occurring due to an operation may saturate the resulting value of the arithmetic operation, and conversely, an underflow may round lower bits. This results in reduced accuracy of the arithmetic operation.

Therefore, for the operation for DNN, a dynamic fixed-point has been proposed that dynamically adjusts the decimal point position of the resulting data of the operation, which is obtained by the calculation. Such a dynamic fixed-point is disclosed in, for example, Japanese Patent Application Publication No. 2018-124681. The fixed-point arithmetic operation is disclosed in, for example, Japanese Patent Application Publication Nos. 2012-203566, 2009-271598, and H07-084975.

SUMMARY

In the dynamic fixed-point method, during the training of the DNN, the arithmetic operation for each layer is performed and the position of the fixed-point of the result of arithmetic operation is adjusted based on the distribution of the valid digits of the result of arithmetic operation. This makes it possible to suppress the occurrence of the overflow and underflow described above, thereby enhancing the accuracy of operation. On the other hand, since the fixed-point used in the pre-training is not adjusted to the optimal position, input data, output data of each layer, and parameters (for example, weight and bias) for the DNN may be set to floating-point numbers so that the pre-training is performed by a floating-point arithmetic unit.

When the pre-training is performed using floating-point numbers, there is no overflow or underflow in the results of operation that occur when it is performed using fixed-point numbers, thereby making it possible to prevent a decrease in the accuracy of intermediate data such as output data and parameters of the respective layers. In addition, the fixed-point of the intermediate data can be adjusted to the optimal position based on the value of the exponent part of the result of arithmetic operation by the floating-point arithmetic unit. Accordingly, the training uses the fixed-point arithmetic unit with the adjusted fixed-point numbers.

However, the configuration in which the DNN processor for performing an arithmetic operation for DNN is equipped with a floating-point arithmetic unit in addition to a fixed-point arithmetic unit to perform the pre-training for the DNN using the floating-point arithmetic unit requires the hardware of floating-point arithmetic unit, and also results in increased power consumption due to the floating-point arithmetic unit.

An aspect of the present embodiment is an information processing apparatus that performs deep learning using a neural network, the information processing apparatus including: a memory; and an arithmetic processing device being able to access the memory, wherein the arithmetic processing device performs a process for a plurality of layers of the neural network in a predetermined direction, the process for the plurality of layers includes:

(a) determining a first decimal point position for setting a range on which a saturation process or a round process are performed when a plurality of pieces of second fixed-point number data, which are obtained by performing an arithmetic operation on a plurality of pieces of first fixed-point number data by the arithmetic processing device, are stored in a register;

(b) performing the arithmetic operation on the plurality of pieces of first fixed-point number data by the arithmetic processing device, performing the saturation process or the round process on the plurality of pieces of second fixed-point number data based on the range set with the first decimal point position and storing first resulting values of the saturation process or the round process in the register, and acquiring first statistical information about a distribution of positions of leftmost set bit for positive number or positions of leftmost zero bit for negative number of each of the plurality of pieces of second fixed-point number data;

(c) determining a second decimal point position for setting a range on which the saturation process or the round process are performed when the plurality of pieces second fixed-point number data are stored in the register based on the first statistical information; and (d) determining, based on a difference between the first decimal point position and the second decimal point position, whether or not the arithmetic operation on the plurality of pieces of first fixed-point number data by the arithmetic processing device is performed again, and performing, when determining the arithmetic operation is performed again, the saturation process or the round process on the plurality of pieces of second fixed-point number data, which are obtained by performing again the arithmetic operation on the plurality of pieces of first fixed-point number data by the arithmetic processing device, based on the range set with the second decimal point position and storing second resulting values of the saturation process or the round process in the register.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 22 is a diagram describing the operation of the statistical information aggregator ST_AGR_1;

DESCRIPTION OF EMBODIMENTS

Figure 1:
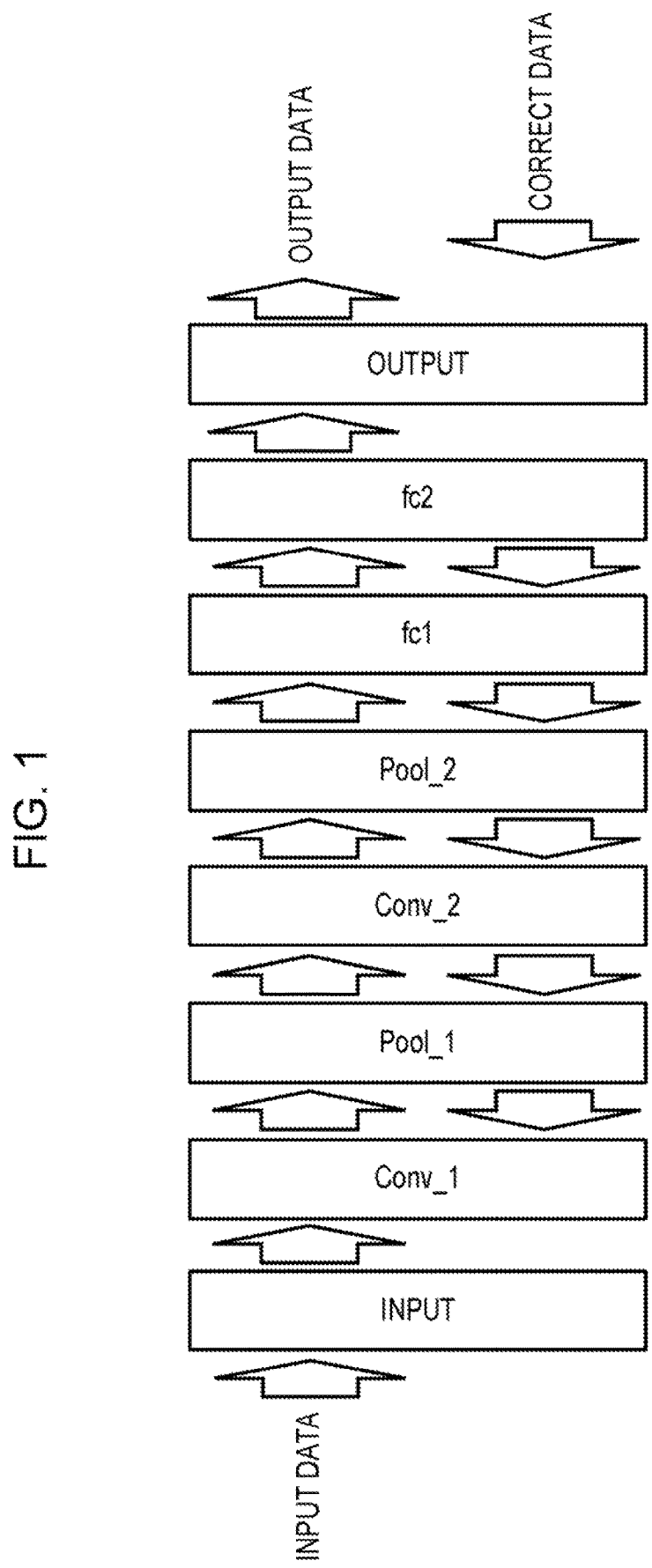
FIG. 1 is a diagram illustrating a configuration example of a deep neural network (DNN)

FIG. 1 is a diagram illustrating a configuration example of a deep neural network (DNN). The DNN in FIG. 1 is an object category recognition model that classifies, for example, an input image, which is received, into a finite number of categories according to the contents (for example, numbers) of the input image. The DNN includes an input layer INPUT, a first convolution layer Conv_1, a first pooling layer Pool_1, a second convolution layer Conv_2, a second pooling layer Pool_2, a first fully connected layer fc1, a second fully connected layer fc2, and an output layer OUTPUT. Each layer has one or more nodes.

In the convolution layer Conv_1, for example, a product-sum operation is performed on pieces of pixel data of an Image input to a plurality of nodes in the input layer INPUT and weights between the nodes, and pieces of pixel data of an output image having image features are output to a plurality of nodes in the convolution layer Conv_1. The same applies to the convolution layer Conv_2.

The pooling layer Pool_1 is a layer having nodes with values determined from local nodes in the convolution layer Conv_1 which is the previous layer. For example, a node in the pooling layer Pool_1 is set to the maximum value in the local nodes to absorb slight changes in the image.

In the output layer OUTPUT, the probability of each category for the image is obtained from the values of the nodes using a softmax function or the like.

Figure 2:
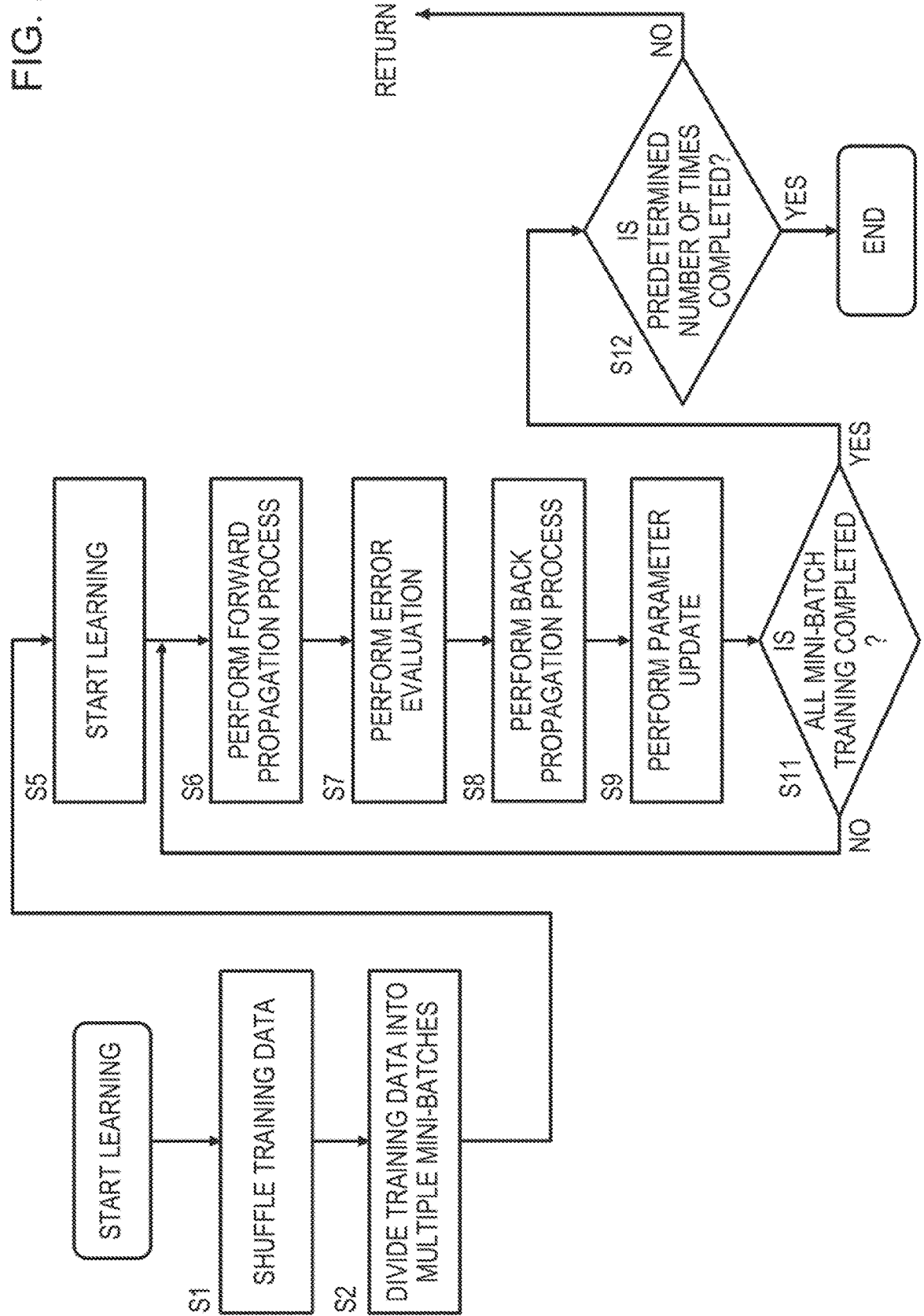
FIG. 2 is a flowchart illustrating an example of a DNN training process.

FIG. 2 is a flowchart illustrating an example of a DNN training process. In the training process, for example, a plurality of pieces of training data including input data and correct data calculated by the DNN from the input data are used to optimize parameters such as weights in the DNN. In the example of FIG. 2, a plurality of pieces of training data are divided into pieces of training data for a plurality of mini-batches according to a mini-batch method so that a plurality of pieces of training data in each mini-batch are received as pieces of input data. Then, parameters such as weights are optimized so as to reduce the sum of squares of differences (errors) between the output data output by the DNN and the correct data for the respective piece of input data in every mini-batches.

As Illustrated in FIG. 2, as a preliminary preparation, the pieces of training data are shuffled (S1), and the shuffled pieces of training data are divided into pieces of training data for the plurality of mini-batches (S2).

In a training S5, a forward propagation process S6, an error evaluation S7, a back propagation process S8, and a parameter update S9 are repeated for each of the divided mini-batches. When the processes for all the mini-batches are completed (YES in S11), the processes of S1 to S2, S5 to S9, and S11 are repeatedly performed for the same training data until the specified number of times is reached (NO in S12).

Instead of repeating the processes of S1 to S2 and S5 to S9 with the same training data until the specified number of times is reached, the training process may be completed when an evaluation value of the training result, for example, the sum of squares of the differences (errors) between the output data and the correct data falls within a certain range.

In the forward propagation process S6, the arithmetic operation for each layer is performed in order from the input side to the output side of the DNN. As described with reference to the example of FIG. 1, in the first convolution layer Conv_1, a convolution arithmetic operation is performed on pieces of input data, which are the pieces of training data included in one mini-batch input to the input layer INPUT, with edge weights or the like, so that a plurality of pieces of operation output data are output. Then, in the first pooling layer Pool_1, a process of weakening the locality of the result of arithmetic operation of the convolution layer Conv_1 is performed. Further, in the second convolution layer Conv_2 and the second pooling layer Pool_2, the same processes as described above are performed. Finally, in the fully connected layers fc1 and fc2, a convolution arithmetic operation is performed with the weights of all the edges and the like, so that the output data is output to the output layer OUTPUT.

Next, in the error evaluation process S7, the sum of squares of the differences between the output data of the DNN and the correct data is computed as an error. Then, the back propagation process S8 is performed that propagates the error from the output side of the DNN to the Input side. In the back propagation process S9, the error is propagated from the output side to the input side, and the propagated error in each layer is differentiated by the parameter, so that change data for the parameter is calculated by a gradient descent method. Then, in the parameter update process S9, the current parameter is updated with the change value of the parameter obtained by the gradient descent method, so that the weights and the like (including biases of each layer are updated in the optimal value direction.

The DNN may be configured so that a plurality of layers are achieved by hardware circuitry and the hardware circuitry performs the arithmetic operations for the respective layers. Alternatively, the DNN may be configured so that a processor for performing the arithmetic operations for the respective layers of the DNN executes a program of performing the arithmetic operations for the respective layers.

Figure 3:
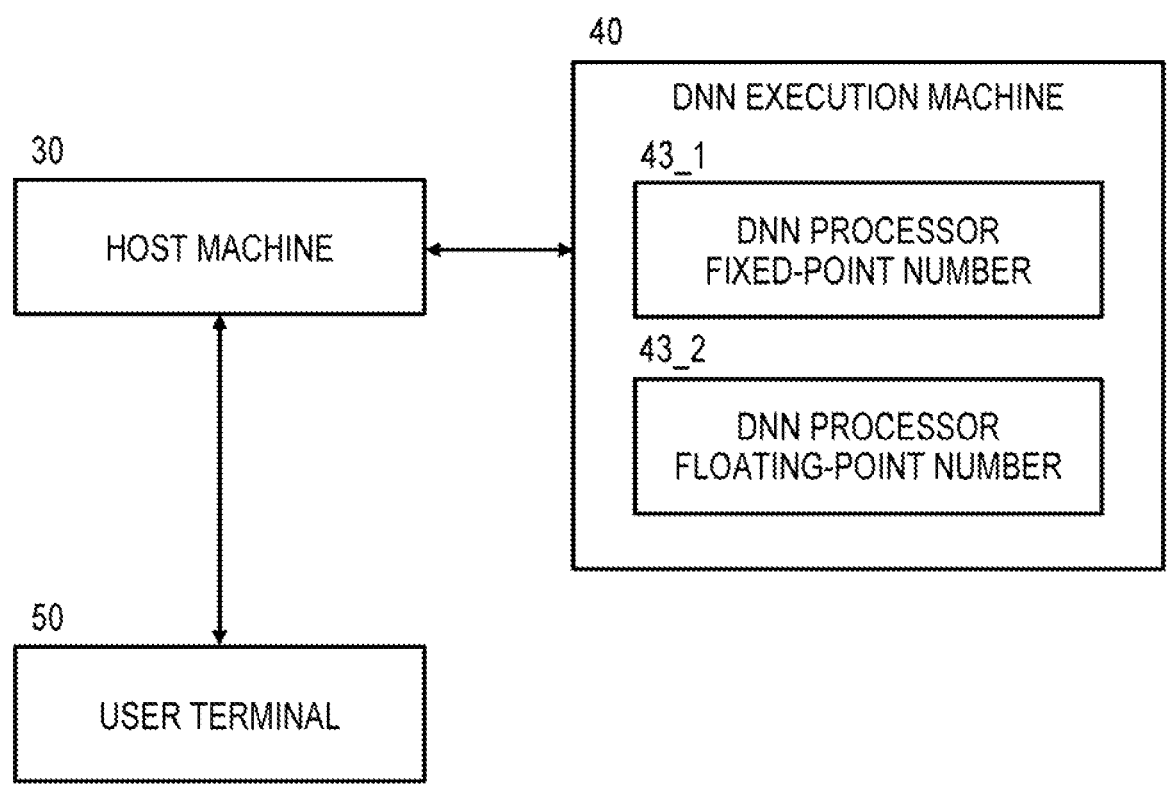
FIG. 3 is a diagram illustrating a configuration example of a deep learning (DL) system according to the present embodiment.

FIG. 3 is a diagram illustrating a configuration example of a deep learning (DL) system according to the present embodiment. The DL system includes a host machine 30 and a DNN execution machine 40. For example, the host machine 30 and the DNN execution machine 40 are coupled via a dedicated interface. In addition, a user terminal 50 is configured to be accessible to the host machine 30, so that the user accesses the host machine 30 from the user terminal 50 to operate the DNN execution machine 40 and execute a deep learning. The host machine 30 generates a program to be executed by a DL execution machine in accordance with an instruction from the user terminal, and transmits the program to the DNN execution machine. Accordingly, the DNN execution machine executes the transmitted program to execute the deep learning.

The DNN execution machine 40 includes a DNN processor 43_1 for performing fixed-point arithmetic operation and a DNN processor 43_2 for performing floating-point arithmetic operation. In the present embodiment, the DNN processor 43_2 for performing floating-point arithmetic operation may not be provided.

In the present embodiment, pre-training is performed by the DNN processor 43_1 for performing fixed-point arithmetic operation, the fixed-point position of intermediate data of the DNN is determined, and training is also performed by the DNN processor 43_1 for performing fixed-point arithmetic operation.

The DNN processor 43_1 for performing fixed-point arithmetic operation includes a statistical Information acquisition circuit that acquires statistical Information about intermediate data such as a result of operation calculated in the DNN and a variable updated by training, and the number of valid most significant bits and/or valid least significant bits of data in a memory or the like. The DNN processor 43_1 acquires the statistical information of the intermediate data obtained by operation while performing training in each of the pre-training and the training, and adjusts the fixed-point position of the intermediate data to the optimal position based on the statistical information.

Figure 4:
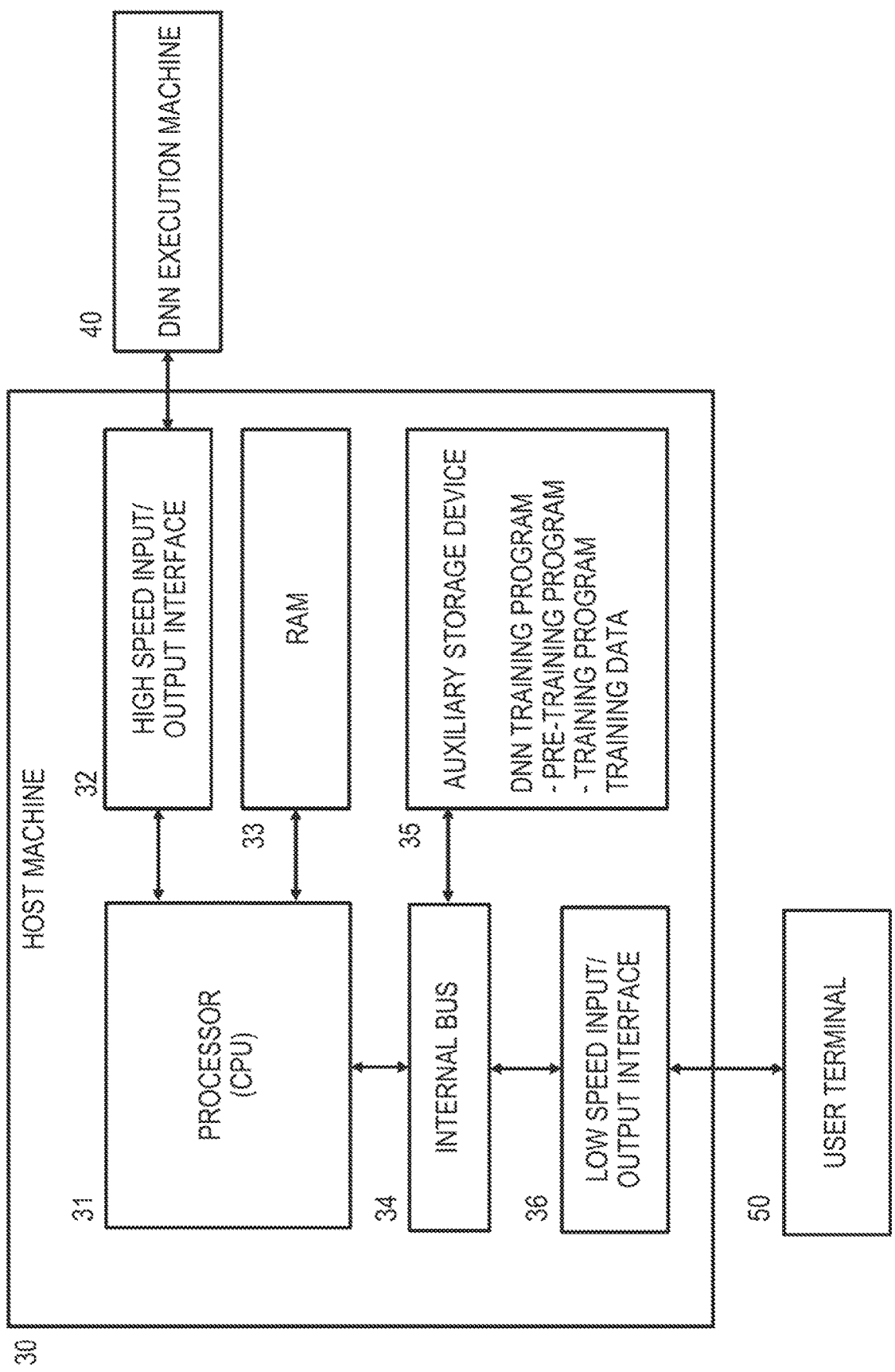
FIG. 4 is a diagram illustrating a configuration example of the host machine 30.

FIG. 4 is a diagram illustrating a configuration example of the host machine 30. The host machine 30 includes a processor 31, a high-speed input/output interface 32 for coupling to the DNN execution machine 40, a main memory 33, and an internal bus 34. The host machine 30 also includes an auxiliary storage device 35 such as a large-capacity HDD coupled to the internal bus 34, and a low-speed input/output interface 36 for coupling to the user terminal 50.

The processor 31 of the host machine 30 executes a program which is stored in the auxiliary storage device 35 and loaded into the main memory 33. The high-speed input/output interface 32 is, for example, an interface that couples the processor 31 such as PCI Express to the hardware of the DL execution machine. The main memory 33 stores therein programs to be executed by the processor and data, and is, for example, an SDRAM.

The internal bus 34 couples the processor to peripheral devices having a lower speed than the processor to relay communication between them. The low-speed input/output interface 36 is for coupling to, for example, a keyboard or mouse of the user terminal such as a USB, or coupling to an Ethernet network.

As illustrated in FIG. 4, the auxiliary storage device, i.e. HDD or SDD, 35 stores therein a DNN training program and training data. The DNN training program includes a pre-training program and a training program. The processor 31 executes the DNN training program, for example, to transmit the pre-training program and the training data to the DNN execution machine, so that the DNN execution machine executes the pre-training program. The processor 31 also executes the DNN training program to transmit the training program and the training data to the DNN execution machine, so that the DNN execution machine executes the actual program.

Figure 5:
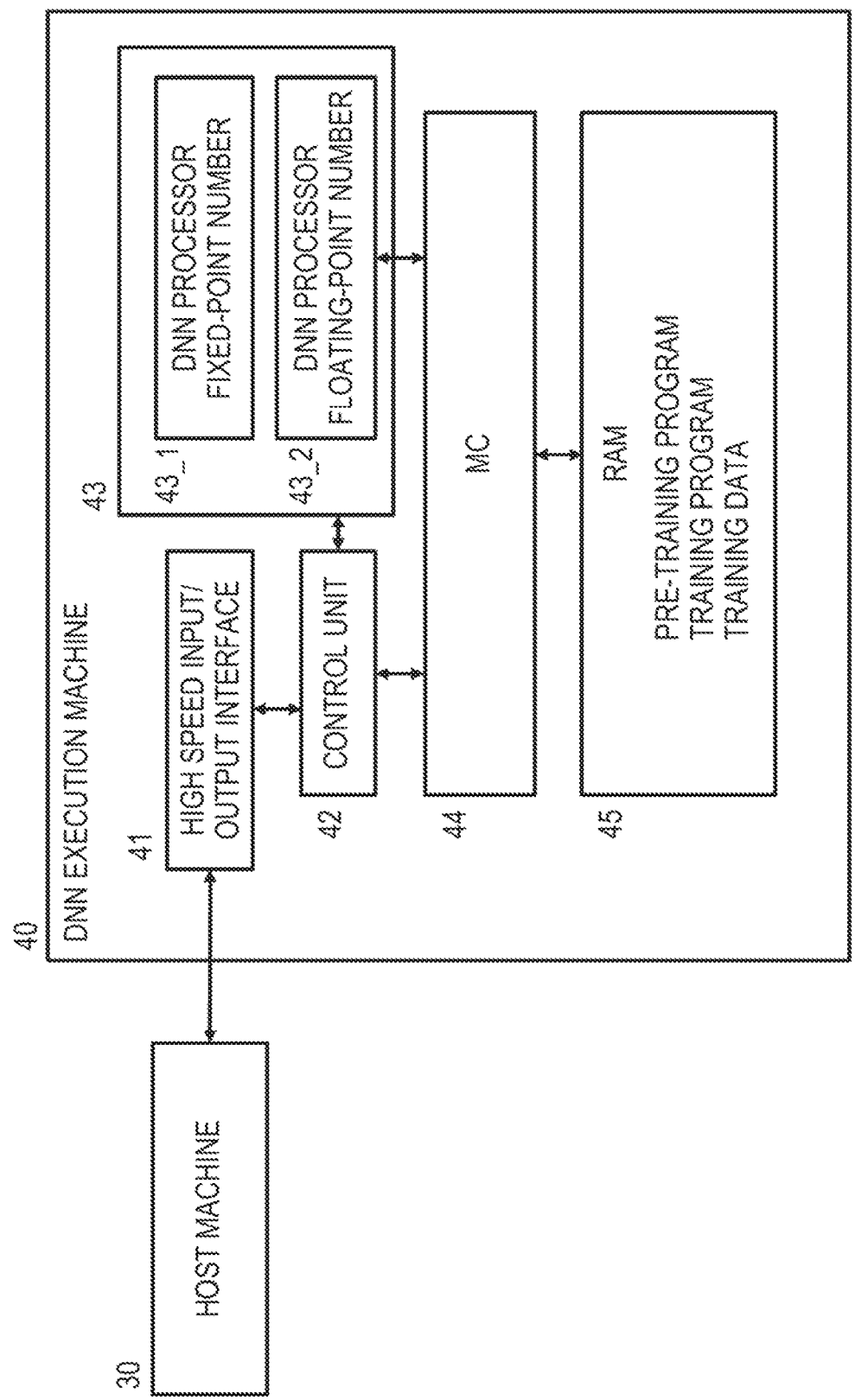
FIG. 5 is a diagram illustrating a configuration example of the DNN execution machine.

FIG. 5 is a diagram illustrating a configuration example of the DNN execution machine. The DNN execution machine 40 includes a high-speed input/output interface 41 that relays communication with the host machine 30, and a control unit 42 that performs corresponding processes based on commands and data from the host machine 30. The DNN execution machine 40 also includes a DNN processor 43, a memory access controller 44, and an internal memory 45.

The DNN processor 43 executes a program based on the program and data transmitted from the host machine to execute processes of deep learning. The DNN processor 43 includes the DNN processor 43_1 for performing fixed-point arithmetic operation and the DNN processor 43_2 for performing floating-point arithmetic operation, as described above. However, the DNN processor 43_2 for performing floating-point arithmetic operation may not be provided.

The high-speed input/output interface 41 is, for example, PCI Express, and relays communication with the host machine 30.

The control unit 42 stores the program and data transmitted from the host machine in the memory 45, and instructs the DNN processor to execute the program in response to commands from the host machine. The memory access controller 44 controls an access process to the memory 45 in response to an access request from the control unit 42 or an access request from the DNN processor 43.

The internal memory 45 stores therein a program to be executed by the DNN processor, data to be processed, data of processing result, and the like. The internal memory 45 is, for example, an SDRAM, faster GDR5, or an HBM2 with high band width.

As described with reference to FIG. 4, the host machine 30 transmits the pre-training program and the training data to the DNN execution machine 40, and further transmits the training program and the training data. These programs and data are stored in the internal memory 45. In response to an instruction for executing from the host machine 30, the fixed-point processor of the DNN execution machine executes the pre-training program and the training program.

Figure 6:
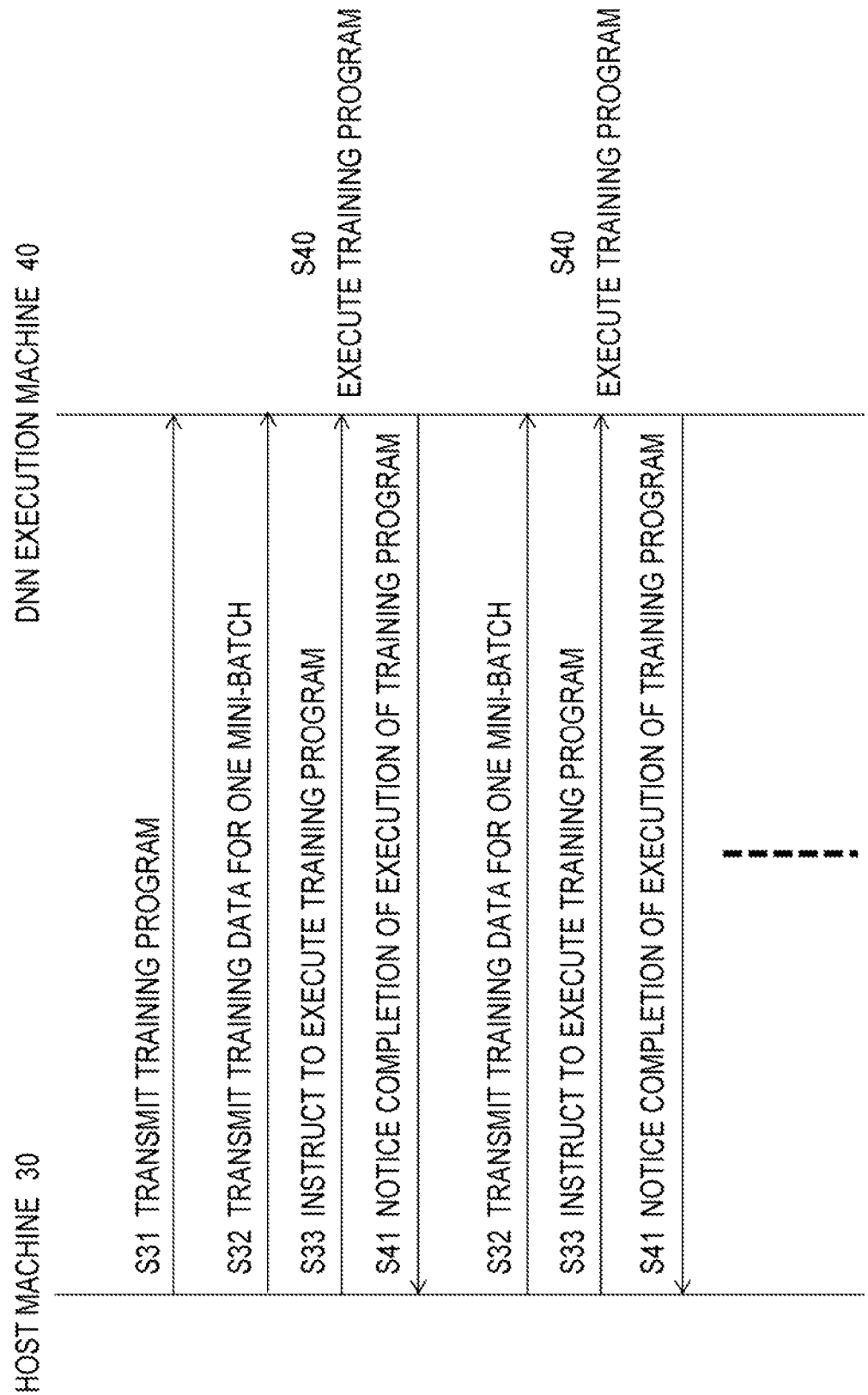
FIG. 6 is a sequence chart illustrating an outline of deep learning process to be performed by the host machine and the DNN execution machine.

FIG. 6 is a sequence chart illustrating an outline of deep learning process to be performed by the host machine and the DNN execution machine. The host machine 30 transmits the training programs for deep learning (for pre-training and training) (S31), transmits training data for one mini-batch (S32), and transmits the instruction for executing the training programs (S33), to the DNN execution machine 40.

In response to these transmissions, the DNN execution machine 40 stores the training data and the training programs in the internal memory 45, and executes the training programs for the training data stored in the memory 45 in response to the instruction for executing the training programs. (S40). The training program is executed by the DNN processor 43_1. Meanwhile, the host machine 30 waits until the execution of the training programs is completed by the DL execution machine.

When the execution of the training programs for deep learning is completed, the DNN execution machine 40 transmits a notification indicating that the execution of the training programs is completed to the host machine 30 (S41).

The host machine 30 transmits training data for the next one mini-batch (S32), and transmits the instruction for executing the training programs (S33). Then, the DNN execution machine 40 executes the training programs (S40), and transmits a notification of completion (S41). These processes are repeated to advance the trainings for deep learning.

In the training for the DNN, the arithmetic operation for each layer is performed in the forward direction of the DNN (forward propagation process); an error between the output data of the output layer and the correct data is propagated in the reverse direction of the DNN to compute the error in each layer and to compute change data for a variable such that the error is reduced (back propagation process); and the variable is updated with the change data for the variable (parameter update). These training processes for the DNN may all be performed by the DNN execution machine 40, or a part of the processes may be performed by the host machine 30.

Deep Learning with Comparative Example

Figure 7:
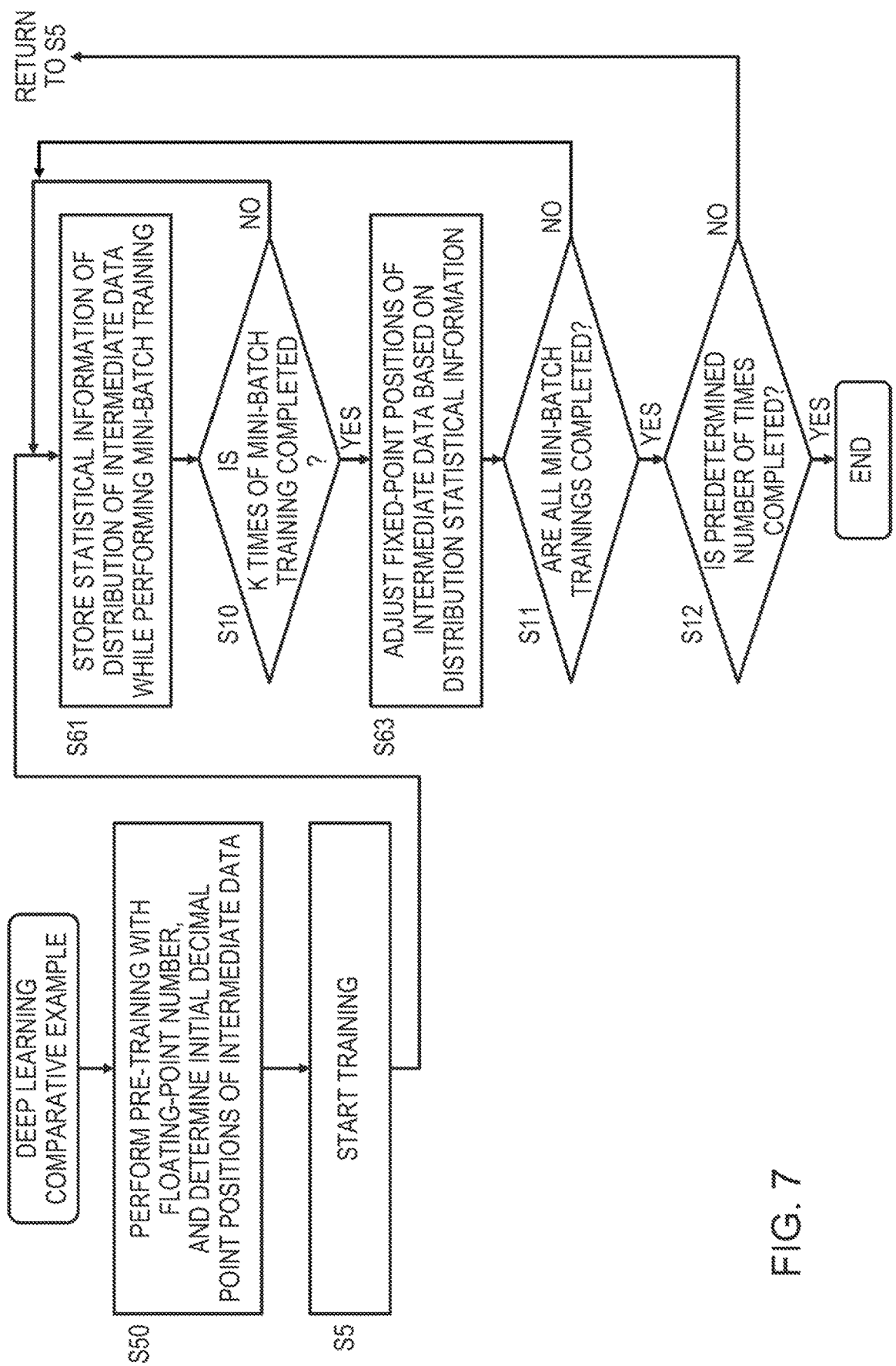
FIG. 7 is a diagram illustrating a flowchart of deep learning (DL) of a comparative example with respect to the present example.

FIG. 7 is a diagram illustrating a flowchart of deep learning (DL) of a comparative example with respect to the present example. In the comparative example, a DNN processor for performing floating-point arithmetic operation performs the pre-training, and a DNN processor for performing fixed-point arithmetic operation performs the training.

First, the DNN processor performs the pre-training with floating-point numbers, and determines the initial decimal point position of each piece of intermediate data (results of arithmetic operation, parameters, etc. in the respective layers) (S50). For the pre-training with floating-point numbers, since the intermediate data in the DNN is floating-point numbers, an exponent part corresponding to the size of the intermediate data is generated. Thus, it is not necessary to adjust the decimal point position like fixed-point numbers. Then, based on the intermediate data of the floating-point numbers, the optimal decimal point position of the fixed-point number of each piece of intermediate data is determined.

Next, the DNN processor starts the training using fixed-point numbers (S5). In the training, the DNN processor acquires and stores statistical information about the distribution of pieces of intermediate data while performing mini-batch training (S61). The DNN processor for performing fixed-point arithmetic operation includes a statistical information acquisition circuit that acquires the statistical information such as distribution of valid bits of arithmetic operation output of the fixed-point arithmetic unit. Therefore, by causing the processor to execute an instruction for arithmetic operation including statistical information acquisition process, it is possible to acquire and store the statistical information of intermediate data during the mini-batch training. Each time the mini-batch training is performed K times (YES in S10), the fixed-point position of each piece of intermediate data in the DNN is adjusted based on the statistical information of the distribution of pieces of intermediate data (S63).

The statistical information acquisition circuit in the processor and a method of adjusting the fixed-point position based on the statistical information of the distribution will be described in detail later.

Then, the DNN processor repeats S61, S10, and S63 until all the mini-batch trainings are completed (NO in S11). When all the mini-batch trainings are completed (YES in S11), the processing returns to the first S5 to repeat all the mini-batch trainings until the predetermined number of times is reached (NO in S12). Note that the processes of S11 and S12 in FIG. 7 are equivalent to the processes of S11 and S12 in FIG. 2.

Figure 8:
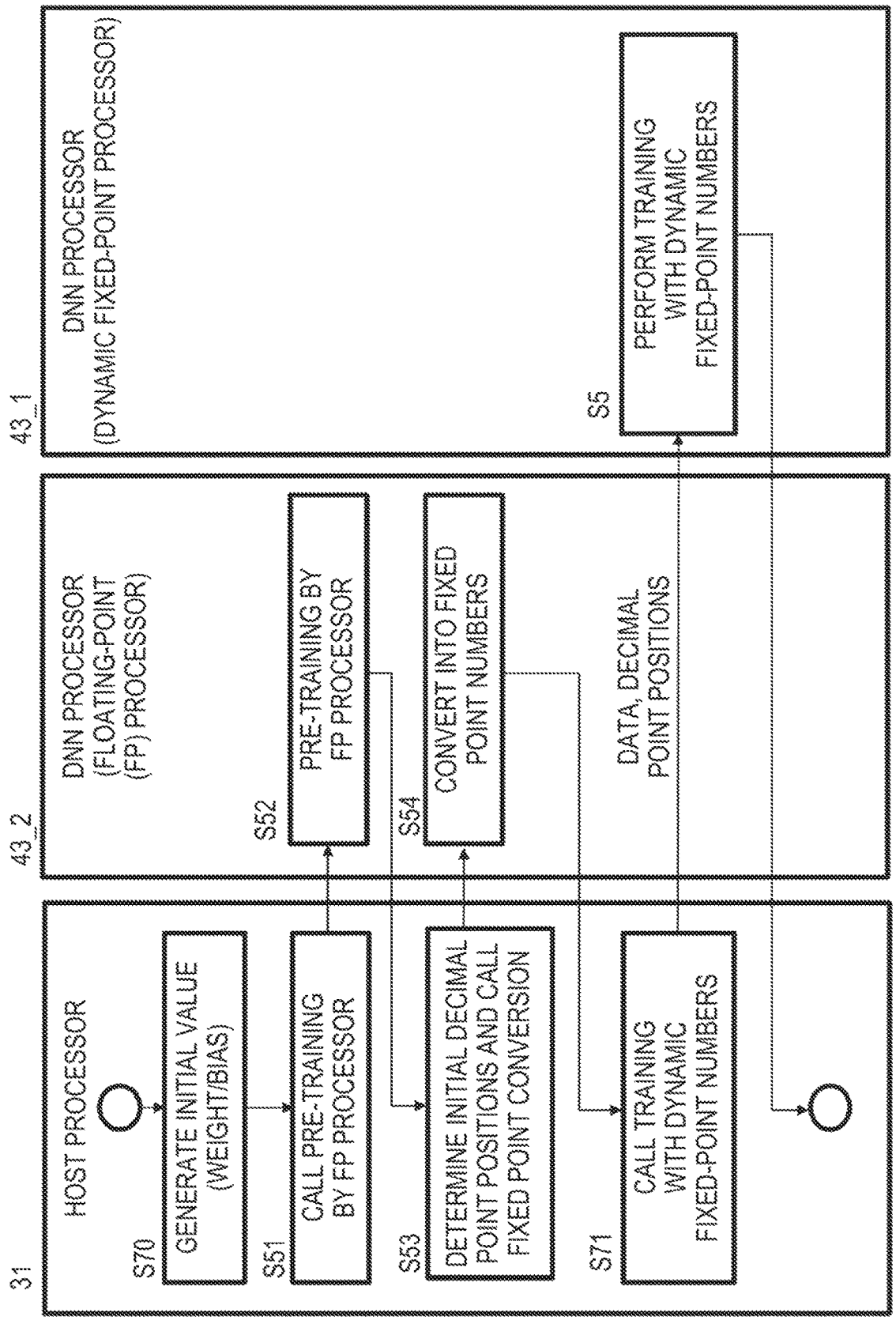
FIG. 8 is a diagram illustrating a flowchart of processes by the plurality of processors in the deep learning of the comparative example of FIG. 7.

FIG. 8 is a diagram illustrating a flowchart of processes by the plurality of processors in the deep learning of the comparative example of FIG. 7. The same processes as those in FIG. 7 are denoted by the same process numbers. First, the host processor 31 generates initial values of parameters such as weights and biases in the DNN (S70). The initial values are floating-point numbers.

Then, the host processor 31 calls the pre-training program for the floating-point processor (S51), and in response to this, the DNN processor 43_2 for performing floating-point arithmetic operation performs the pre-training (S52). The pre-training by the floating-point arithmetic operation includes, for example, performing the mini-batch training a plurality of times.

Further, the host processor 31 determines initial decimal point positions of the fixed-point numbers based on the floating-point numbers of the intermediate data obtained by the pre training, and reads a program for converting the floating-point numbers of the intermediate data into fixed-point numbers (S53). In response to this, the DNN processor 43_2 for performing floating-point arithmetic operation converts the floating-point numbers of the intermediate data into fixed-point numbers (S54). The floating-point processor 43_2 includes a circuit for converting a floating-point number into an integer, and uses the circuit to convert the floating-point numbers into the fixed-point numbers by a program.

Next, the host processor 31 calls a program for training using dynamic fixed-point numbers, and transmits various data and their decimal point position information to the fixed-point processor 43_1 (S71). In response to this, the DNN processor 43_1 for performing fixed-point arithmetic operation performs the training performed while dynamically adjusting the decimal points of the fixed-point numbers (S5).

Deep Learning According to First Embodiment

Figure 9:
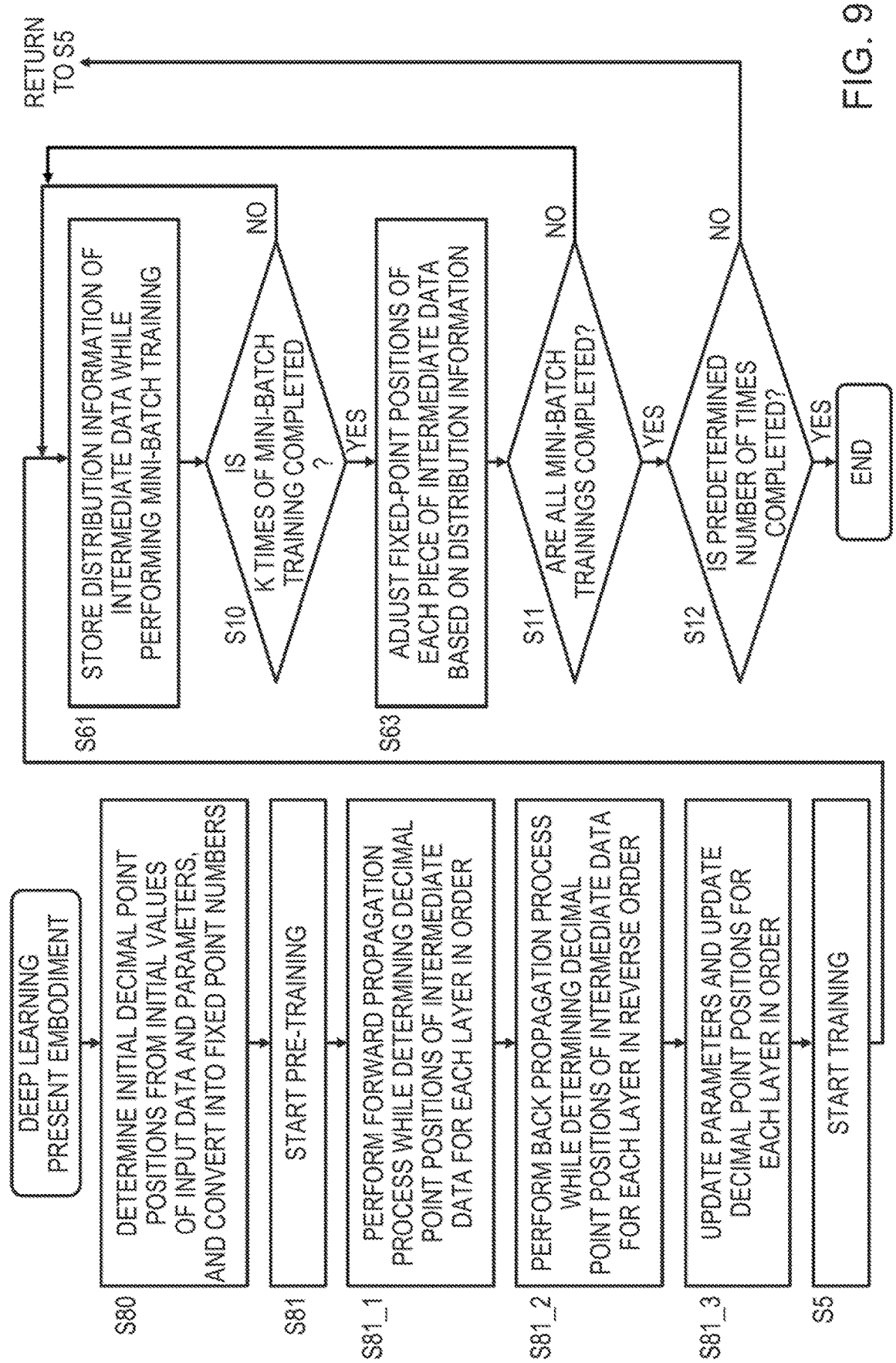
FIG. 9 is a diagram illustrating a flowchart of the deep learning according to the first embodiment.

FIG. 9 is a diagram illustrating a flowchart of the deep learning according to the first embodiment. In the present embodiment, the pre-training and the training are performed by the DNN processor for performing fixed-point arithmetic operation.

First, the host processor determines an initial decimal point position from input data of training data and initial values of parameters such as weights and biases in the DNN (S80). Then, the host processor converts the initial values into fixed-point numbers.

Next, the DNN processor 43_1 for performing fixed-point arithmetic operation starts the pre-training (S81). In the pre-training, the DNN processor performs the pre-training while determining the decimal point positions of Intermediate data (output data of the convolution layers, output data of the pooling layers, output data of the fully connected layers, output data of the output layer, parameters such as weights and biases of the respective layers, update values of the parameters, etc.) in the DNN.

In the pre-training, the fixed-point DNN processor 43_1 performs the forward propagation process for each layer in the DNN in order while determining the decimal point positions of the intermediate data of the layer (S81_1). The forward propagation process is a process of performing the arithmetic operations for the respective layers in order from the input layer to the output layer.

Next, in the pre-training, the fixed-point DNN processor performs the back propagation process for each layer in the DNN in reverse order while determining the decimal point positions of the intermediate data of the layer (S81_2). The back propagation process computes the error gradients in the respective layers in the DNN in reverse order from the output layer to the input layer from the error (difference) between the output data of the output layer and the correct data, and computes change difference data of the parameters such that the error in each layer is minimized.

Finally, in the pre-training, the fixed-point DNN processor updates the parameters with the change difference data for the respective layers in order, and updates the decimal point positions of the updated parameters (S81_3).

In the pre-training described above, temporary decimal point positions are determined for the intermediate data. Then, the fixed-point DNN processor 43_1 acquires the statistical information about the distribution of the intermediate data while performing the arithmetic operations of the respective layers in the pre-training. Further, the fixed-point DNN processor determines the optimal decimal point positions of the intermediate data based on the distribution information of the statistical information in each layer. As described later, after the optimal decimal point positions of the intermediate data of each layer in the forward propagation and the back propagation, if the determined decimal point position does not match the temporary decimal point position, or if the positions differ from each other by equal to or greater than a threshold, then the arithmetic operation for the corresponding layer is performed again with a fixed-point number of the determined decimal point position. This makes it possible to enhance the accuracy of the intermediate data of each layer during the pre-training.

After the pre-training is completed, the fixed-point DNN processor starts the training (S5). The processes of S61, S10, S63, S11, and S12 for the training are the same as those in FIG. 7.

That is, in the training, as illustrated in FIG. 7, the fixed-point DNN processor performs the forward propagation process S6, the error evaluation S7, the back propagation process S8, and the update S9 of the parameters (weights, biases, etc.) on the pieces of training data of K mini-batches while acquiring the statistical information of the intermediate data (S61). Then, the fixed-point DNN processor adjusts the decimal point positions of the intermediate data based on the statistical information of the intermediate data acquired by K mini-batch trainings (S63). The fixed-point DNN processor repeatedly performs the K mini-batch trainings S61 and the adjustment of the decimal point positions of the intermediate data S63 until all the mini-batch trainings are completed (S11). When all the mini-batch trainings are completed (YES in S11), the processes of S5 to S11 are repeatedly performed until the predetermined number of times is reached.

The pre-training with fixed-point numbers described above is preferably performed on a plurality of pieces of training data of one mini-batch or several mini-batches that are obtained by dividing training data for the deep learning. Then, the decimal point positions of the intermediate data are adjusted based on the statistical information in each layer in the forward propagation process and each layer in the back propagation process. On the other hand, in the training, every time the training is performed and completed on the pieces of training data of K mini-batches, the decimal point positions of the intermediate data are adjusted based on the statistical information about the distribution of the intermediate data. In the training, the K mini-batch trainings and the adjustment of the decimal point positions of the intermediate data are repeatedly performed until the DNN reaches a desired state (until the predetermined number of times is reached or the error converges to less than a reference value). When all the mini-batch trainings are completed, a learning rate is updated, the training data is rearranged, and then the trainings are repeatedly performed.

Figure 10:
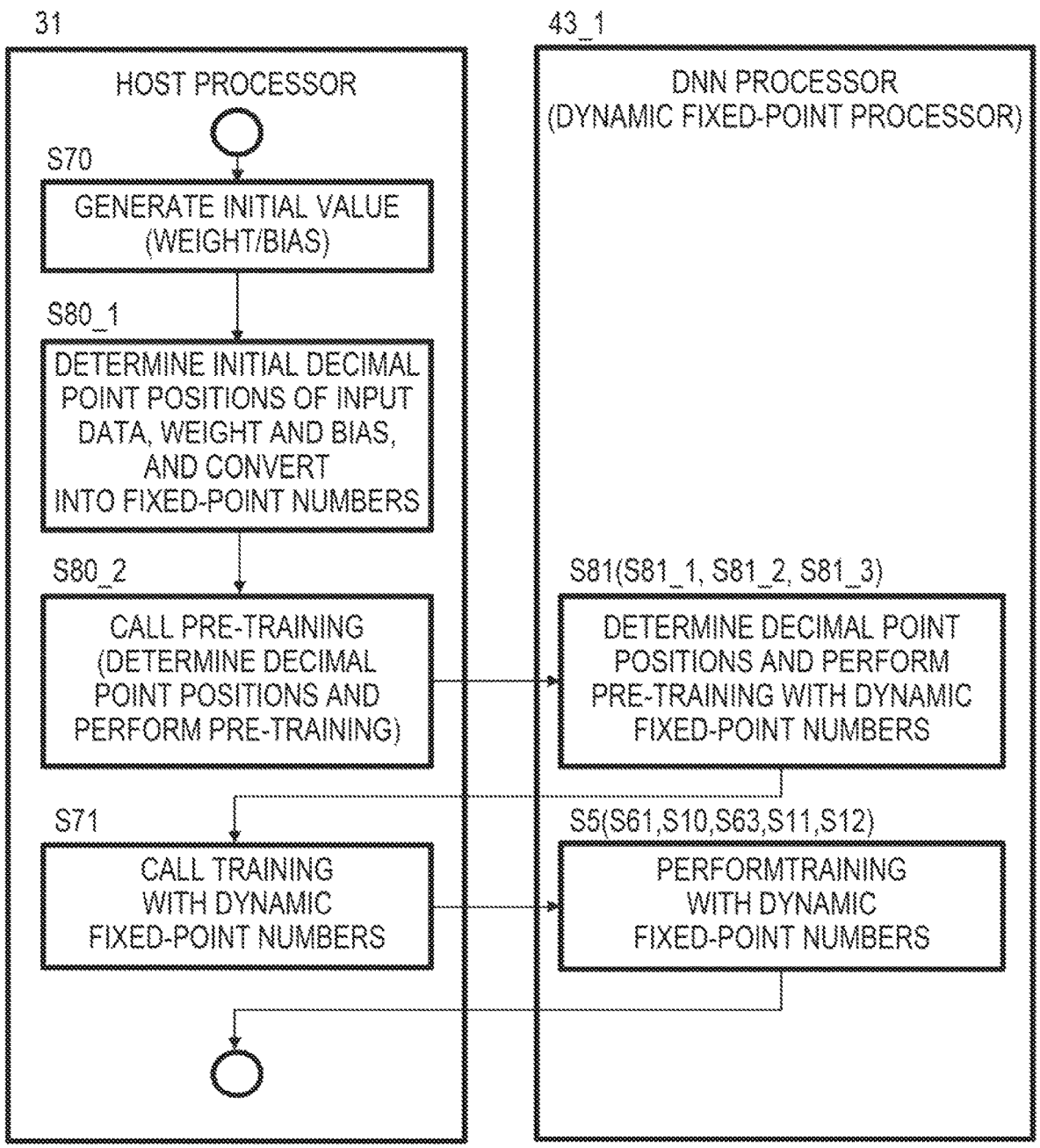
FIG. 10 is a diagram illustrating a flowchart of processes by the plurality of processors in the deep learning of FIG. 9.

FIG. 10 is a diagram illustrating a flowchart of processes by the plurality of processors in the deep learning of FIG. 9. The same processes as those in FIG. 9 are denoted by the same process numbers.

First, the host processor 31 generates initial values of parameters such as weights and biases in the DNN (S70). The initial values are floating-point numbers. Next, the host processor determines the initial decimal point positions of input data and parameters such as weights and biases, and converts the floating-point numbers into fixed-point numbers with the initial decimal point positions (conversion to fixed-point numbers) (S80_1). Since the input data and the parameters are floating-point numbers, the host processor determines the optimal fixed-point positions based on the exponent part or based on the maximum value and the minimum value.

Then, the host processor 31 calls the pre-training program for the fixed-point DNN processor (S80_2), and in response to this, the fixed-point DNN processor 43_1 executes the pre-training program to perform the pre-training (S81). The pre-training by the fixed-point arithmetic operation includes, for example, performing the mini-batch training once or several times, and includes the processes of S81_1, S81_2, and S81_3 in FIG. 9. The pre-training is also performed using dynamic fixed-point numbers, and the decimal point positions of the intermediate data of each layer are determined while the arithmetic operation for the layer is performed. Although details will be described later, the fixed-point DNN processor acquires the statistical information about the distribution of the intermediate data, and determines the optimal decimal point positions based on the distribution of the intermediate data.

Next, the host processor calls the training program for the fixed-point DNN processor (S71), and in response to this, the fixed-point DNN processor 43_1 executes the training program using the dynamic fixed-point numbers to perform the training (S5). In the training with the dynamic fixed-point numbers, K mini-batch trainings are repeatedly performed until all the mini-batch trainings are completed, and includes the processes of S61, S10, S63, S11, and S12 of FIG. 9. The training with the dynamic fixed-point numbers is the same as that in the comparative example, and thus the description thereof is not repeated.

Outline of Actual Training with Dynamic Fixed-point Numbers

The training with dynamic fixed-point numbers is disclosed in a Japanese publication (Japanese Patent Application Publication No. 2018-124681), and the disclosure of the publication is incorporated herein by reference.

Figure 11:
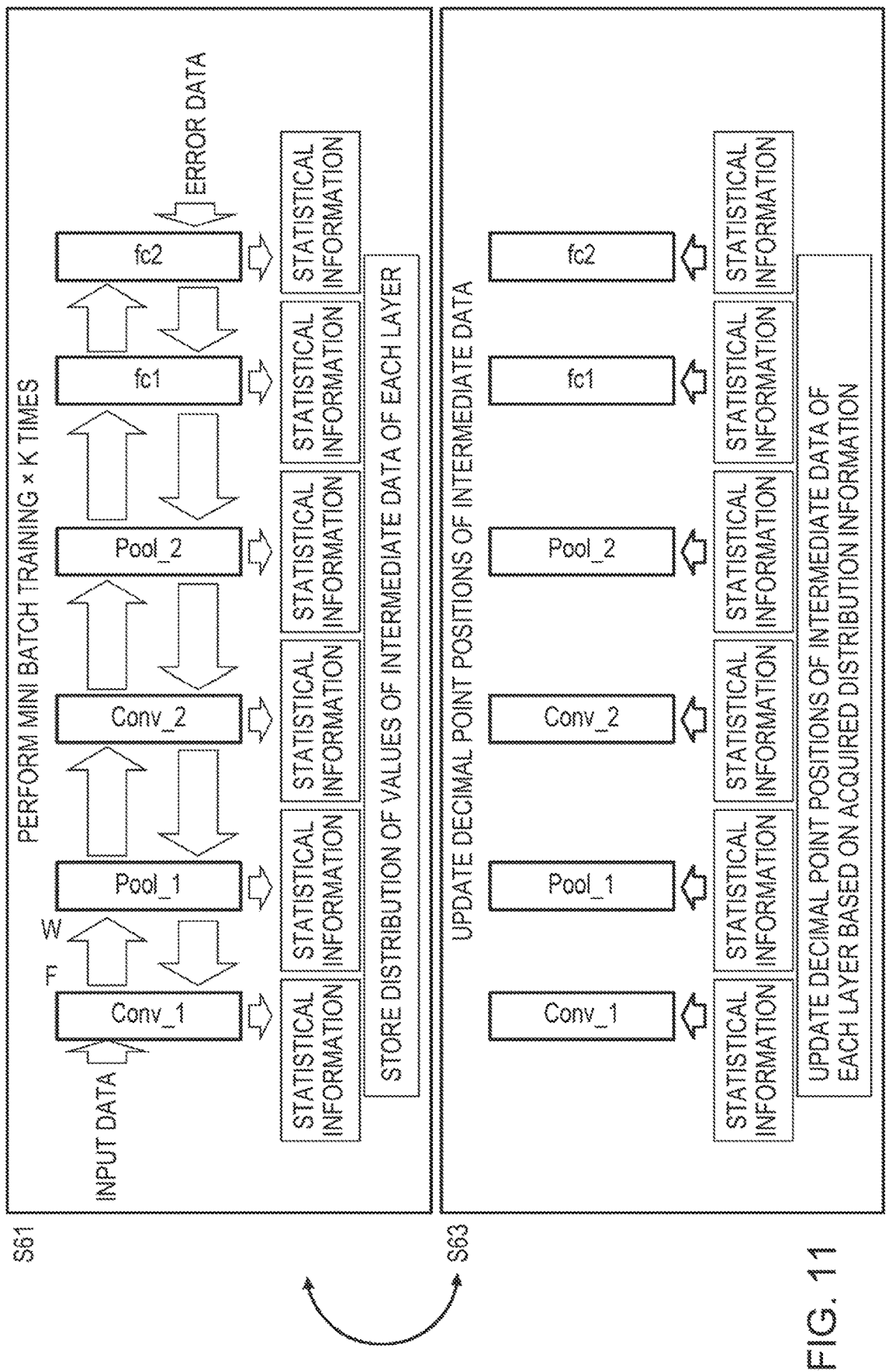
FIG. 11 is a diagram illustrating the processes of S61 and S63 for the training with dynamic fixed decimal numbers.

FIG. 11 is a diagram illustrating the processes of S61 and S63 for the training with dynamic fixed decimal numbers. In the process of S61 for the training illustrated in FIG. 9, the fixed-point DNN processor repeatedly performs the mini-batch training K times. In each mini-batch training, the processor acquires and stores the statistical information about the distribution of the intermediate data of each layer for each layer while performing the forward propagation process, the back propagation process, and the process of updating parameters for the respective layers in order on the plurality of pieces of training data of the mini-batch.

Next, in the process of S63 for the training, the fixed-point DNN processor determines and updates the optimal decimal point positions of the intermediate data of each layer based on the distribution of valid bits of the plurality of pieces of intermediate data included in the stored statistical information.

Figure 12:
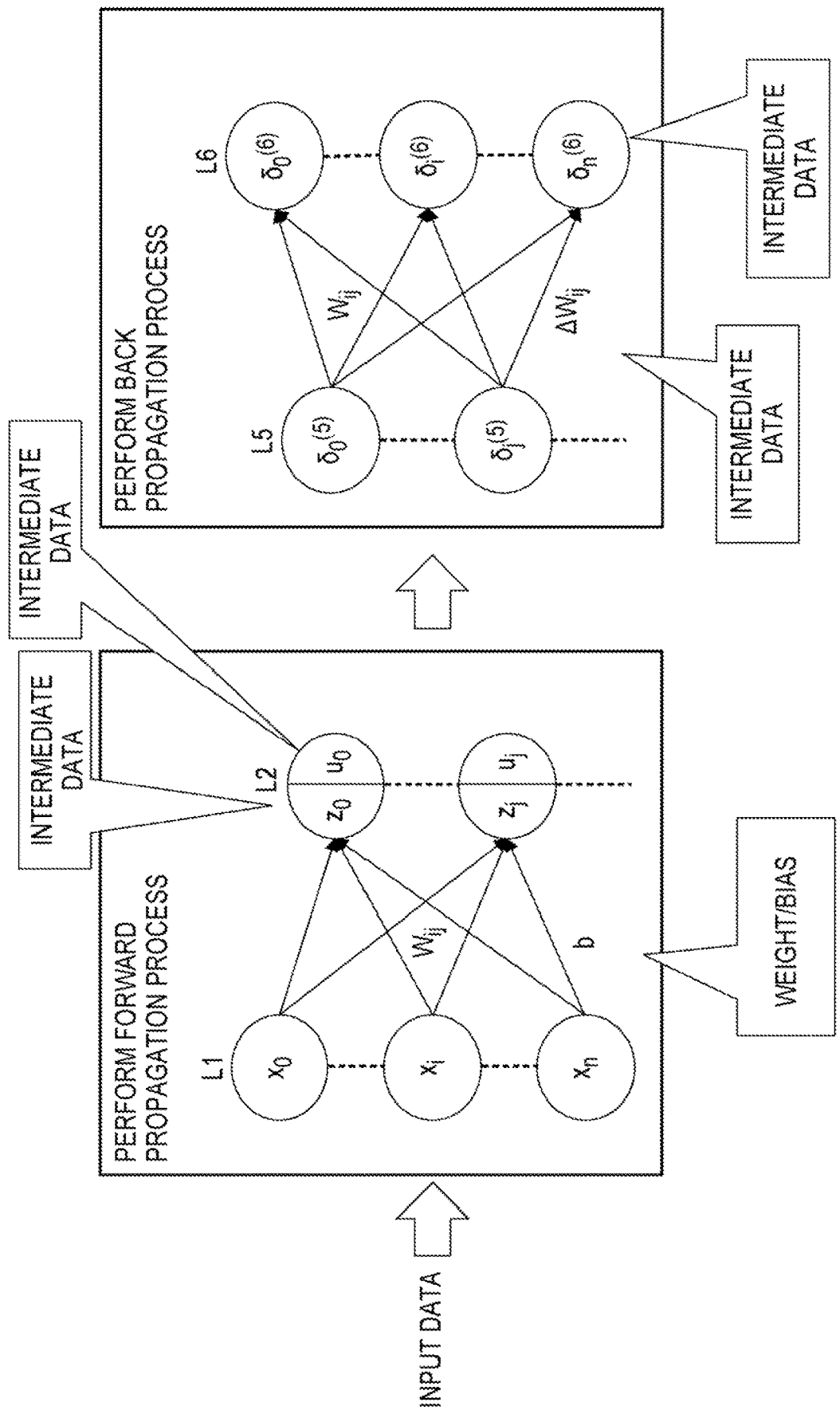
FIG. 12 is a diagram illustrating the forward propagation process and the back propagation process in the training.

FIG. 12 is a diagram illustrating the forward propagation process and the back propagation process in the training. In the forward propagation process, the fixed-point arithmetic unit in the processor adds a bias b to a cumulative sum of values obtained by multiplying each of data $X_0$ to $X_n$ of nodes in a layer L1 closer to the input side by a weight $W_{ij}$ of the link between them to compute output data $Z_0$ to $Z_j$ ... of nodes in a layer L2 closer to the output side. Further, the fixed-point arithmetic unit computes output data $U_0$ to $U_j$ ... of an activation function for the output data $Z_0$ to $Z_1$ ... by an activation function for the layer L2. The computations in the layers L1 and L2 are repeated from the input side to the output side.

On the other hand, in the back propagation process, the fixed-point arithmetic unit in the processor computes error gradients $\delta_0^{(5)}$ to $\delta_j^{(5)}$ ... in a layer L5 closer to the input side from error gradients $\delta_0^{(6)}$ to $\delta_i^{(6)}$ to $\delta_n^{(6)}$ (propagated gradient of differences between the output data and the correct data) in a layer L6 closer to the output side. Then, the fixed-point arithmetic unit computes difference update data $\Delta W_{ij}$ of weight according to the direction of gradients of values obtained by differentiating the error gradients $\delta_0^{(5)}$ to $\delta_i^{(5)}$ to $\delta_n^{(5)}$ in the layer L5 with a parameter such as the weight $W_{ij}$. The computations in the layers L6 and L5 are repeated from the output side to the input side.

Furthermore, in the process of updating the parameters for each layer in order, an updated weight $W_{ij}$ is computed by adding the difference update data $\Delta W_{ij}$ to the existing weight We.

As illustrated in FIG. 12, the output data $Z_0$ to $Z_j$ ... In the layer L2, the output data $U_0$ to $U_j$ ... of the activation function, the error gradients $\delta_0^{(6)}$ to $\delta_i^{(6)}$ to $\delta_n^{(6)}$ in the layer L6, the error gradients $\delta_0^{(5)}$ to $\delta j^{(5)}$ ... in the layer L5, the difference update data $\Delta W_{ij}$ of weight, and the updated weight $W_{ij}$ are all intermediate data in the DNN. By adjusting the decimal point positions of these pieces of intermediate data to optimal positions, it is possible to enhance the operation accuracy of each piece of intermediate data, and to also enhance the accuracy of the training.

Figure 13:
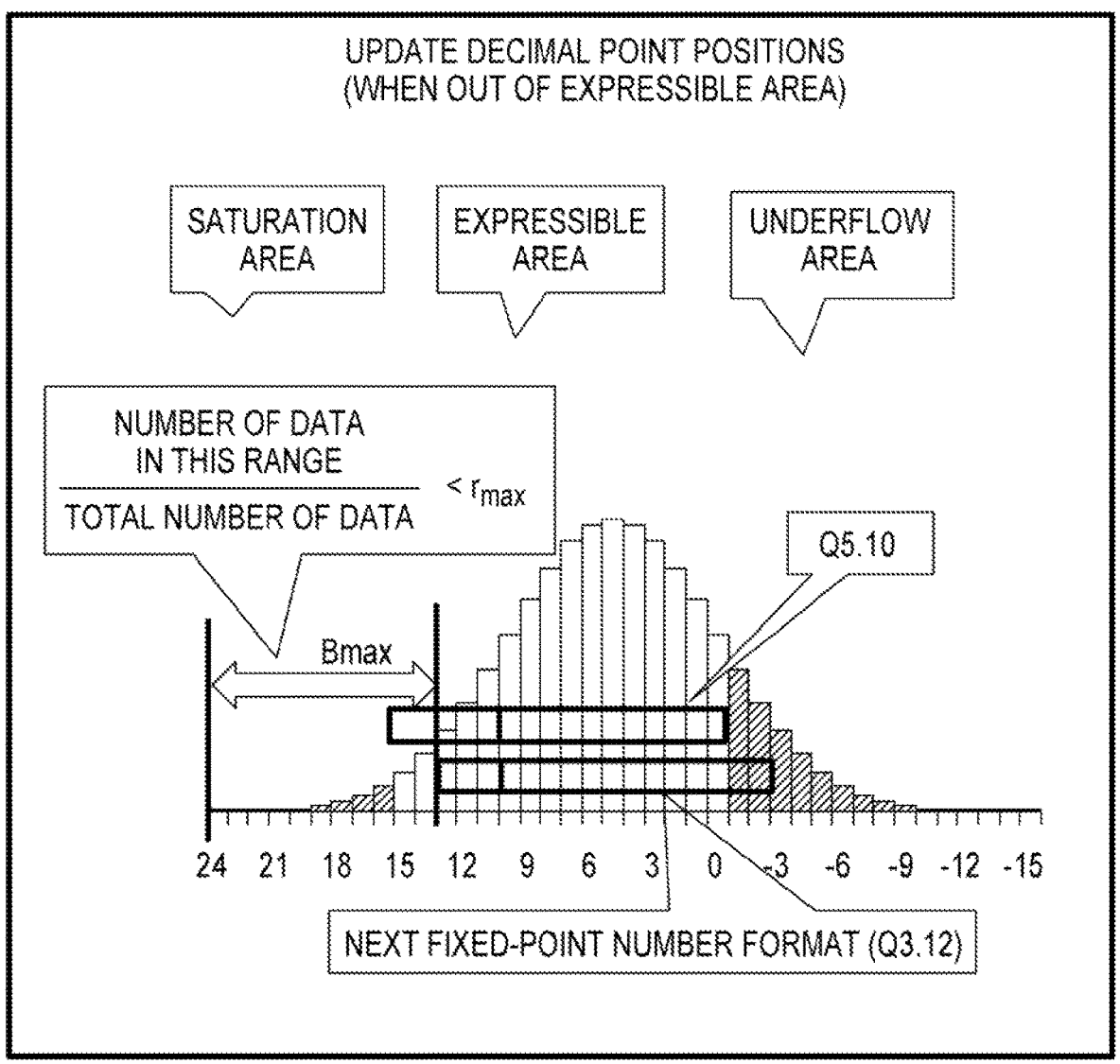
FIGS. 13 and 14 are diagrams illustrating statistical information about the distribution of the intermediate data and a method of adjusting the decimal point position based on the distribution.
Figure 14:
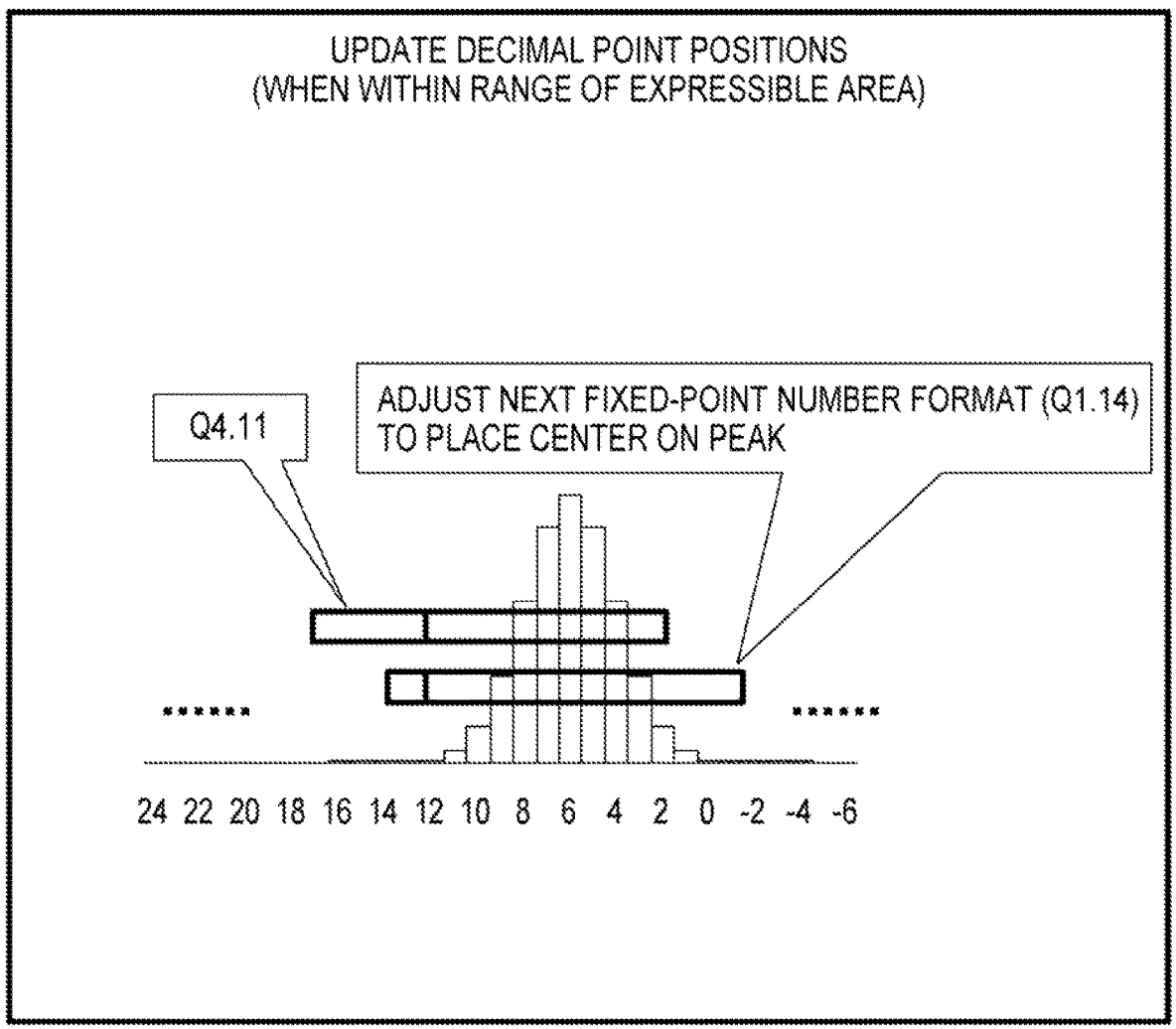

FIGS. 13 and 14 are diagrams illustrating statistical information about the distribution of the intermediate data and a method of adjusting the decimal point position based on the distribution. As described later, the fixed-point DNN processor includes a plurality of fixed-point arithmetic units, and a statistical information acquisition circuit that obtains statistical Information about the distribution of valid bits of intermediate data, such as the output of each arithmetic unit and the resulting data of operation stored in the memory 45.

The statistical information about the distribution of valid bits of the intermediate data is, for example, as follows.

(1) Distribution of positions of leftmost set bit for positive number and positions of leftmost zero bit for negative number (2) Distribution of positions of non-zero least significant bits (3) Maximum value of positions of leftmost set bit for positive number and positions of leftmost zero bit for negative number (4) Minimum value of positions of non-zero least significant bits (1) The positions of leftmost set bit for positive number and positions of leftmost zero bit for negative number are the positions of the most significant bit of the valid bits of a piece of intermediate data. Here the positive number includes zero.

(2) The position of a non-zero least significant bit is the position of the least significant bit of the valid bits of a piece of intermediate data. The position of a non-zero least significant bit is the position of the least significant bit of "1", non-zero, if the sign bit is 0 (positive), and also the position of the least significant bit of "1" if the sign bit is 1 (negative). If the sign bit is 1, the bits other than the sign bit are represented by two's complement, and the process of converting a two's complement into the original number includes the process of subtracting 1 from the two' complement and inverting 1 and 0 to 0 and 1. Accordingly, the least significant bit of "1" becomes "O" by decrement of 1 and becomes "1" by bit inversion, and thus the least significant bit of "1" is at the position of the least significant bit of the valid bits.

(3) The maximum value of the positions of the leftmost set bit for positive number and positions of leftmost zero bit for negative number is the maximum position among the positions of the most significant bits of the valid bits of the plurality of pieces of intermediate data. Similarly, (4) the minimum value of the positions of the non-zero least significant bit is the minimum position among the positions of the least significant bits of the valid bits of the plurality of pieces of intermediate data.

FIGS. 13 and 14 illustrate, as examples, histograms of (1) the distribution of the positions of the leftmost set bit for positive number or leftmost zero bit for negative number. The horizontal axis indicates the valid most significant bit of a piece of intermediate data corresponding to each bin of the histogram, and the vertical axis indicates the number of pieces of intermediate data having the valid most significant bit of each bin. In these examples, the number of bins is −15 to +24, that is, 40 in total.

The most significant bin in the distribution corresponds to (3) the maximum value of the positions of the leftmost set bit for positive number or leftmost zero bit for negative number.

Note that the numerical values indicated on the horizontal axes of FIGS. 13 and 14 indicate the relative bit position with respect to the least significant bit of the decimal part of the output data. For example, "1" indicates a digit one higher than the least significant bit of the output data, and "−1" indicates a digit one lower than the least significant bit of the output data.

For a 16-bit fixed-point number, the number of bits excluding the sign bit is 15 bits. The format for the fixed-point number is expressed as Qn.m. Specifically, Qn.m has an integer part of n bits and a decimal part of m bits. The decimal point position is located between the integer part and the decimal part.

On the other hand, the spread of distribution of the positions of the leftmost set bit for positive number or leftmost zero bit for negative number (the number of bins in the histogram) varies depending on the plurality of pieces of intermediate data. The spread of distribution of the histogram in FIG. 13 is from the bin of −12 to the bin of +20, that is, the number of bins of 32 (=12+20), which does not fall within a fixed-point number of 15 bits (an area expressible as a fixed-point number). Data whose leftmost set bit position is more than 15 are overflowed and saturated, and data whose left most set bit position is less than 0 are underflowed and rounded. On the other hand, in the histogram of FIG. 14, the number of bins from the bin of 0 to the bin of +12 is 13, which falls within a fixed-point number of 15 bits.

Therefore, the method of determining the decimal point position based on the statistical information that is a histogram differs depending on whether the horizontal width (number of bins) of the histogram does not fall within the expressible area (15 bits) (FIG. 13), that is, exceeds 15 bits, or falls within the expressible area (FIG. 14).

When a horizontal width (number of bins) of 32 of the histogram of FIG. 13 does not fall within the expressible area (15 bits), that is, exceeds 15 bits, the fixed-point number format (decimal point position) is determined as follows. Specifically, the maximum number of bits $B_{MAX}$ on the higher bit side is determined such that it satisfies that the ratio of the number of data on the higher bit side of the histogram to the total number of data is less than a predetermined threshold $r_{max}$, and the fixed-point number format is determined to have bits lower than the determined number of bits $B_{MAX}$. In other words, saturation due to overflow of data within the determined number of bits $B_{MAX}$ is allowed.

In the example of FIG. 13, the existing fixed-point number format Q5.10 contains bits of 0 to +15, while the fixed-point number format is changed to Q3.12 which contains bits of −2 to +13 after update. As a result of this change, for the intermediate data having the leftmost set bit for positive number or leftmost zero bit for negative number positioned in +13 to +22, its value is saturated due to overflow, while for the intermediate data having the leftmost set bit for positive number or leftmost zero bit for negative number positioned in −1 or −2, at least the leftmost set bit for positive number or leftmost zero bit for negative number is not rounded.

In the example of FIG. 14, since the existing fixed-point number format Q4.11 is changed to the higher bit side of the histogram, the fixed-point number format is changed to Q1.14 after update. For Q1.14, the central bit of the format Q1.14 is located at the peak position of the histogram. As a result, for the intermediate data having the leftmost set bit for positive number or leftmost zero bit for negative number in 1, 0, or +1, at least the leftmost set bit for positive number or leftmost zero bit for negative number is not rounded.

In the pre-training of FIGS. 9 and 10, the initial decimal point positions of the intermediate data are temporarily determined, and the statistical information about the distribution of the intermediate data is acquired in each of the forward propagation process, the back propagation process, and the parameter update process for the mini-batch training. Then, based on the statistical information, the decimal point positions of the intermediate data are determined in the same manner as in FIGS. 13 and 14.

When the decimal point position determined based on the statistical information does not match the decimal point position temporarily determined based on the statistical information or they differ by equal to or greater than a threshold in each of the forward propagation process and the back propagation process, the forward propagation process and the back propagation process for the mini-batch training are performed again with the decimal point position determined based on the statistical information. By performing the processes again in this way, it is possible to enhance the accuracy of the forward propagation process, to also enhance the accuracy of the next back propagation process, and also enhance the accuracy of the parameter update process.

Details of Pre-training according to Present Embodiment

Figure 15:
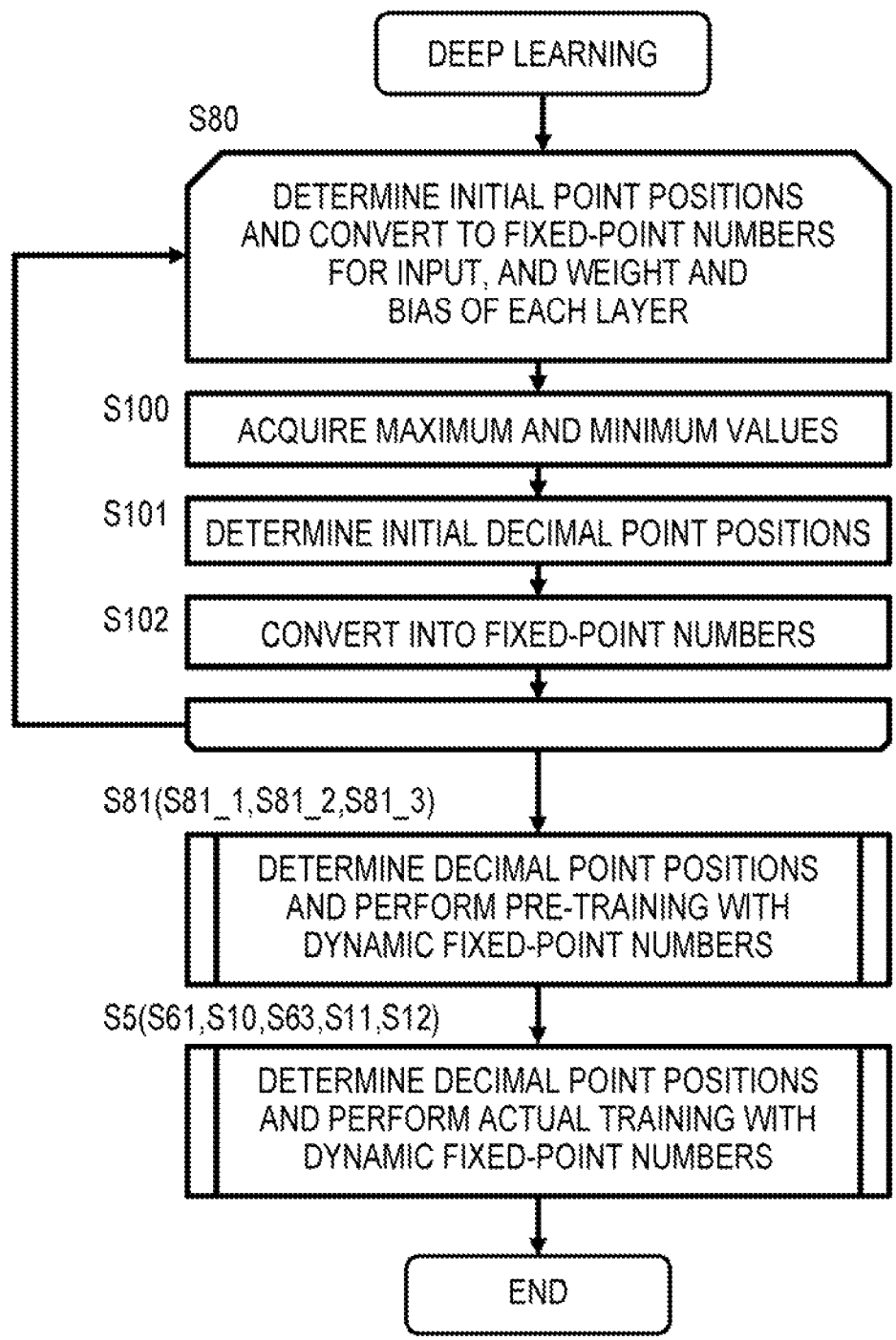
FIGS. 15 and 16 are diagrams illustrating detailed flowcharts of the pre-training according to the present embodiment.
Figure 16:
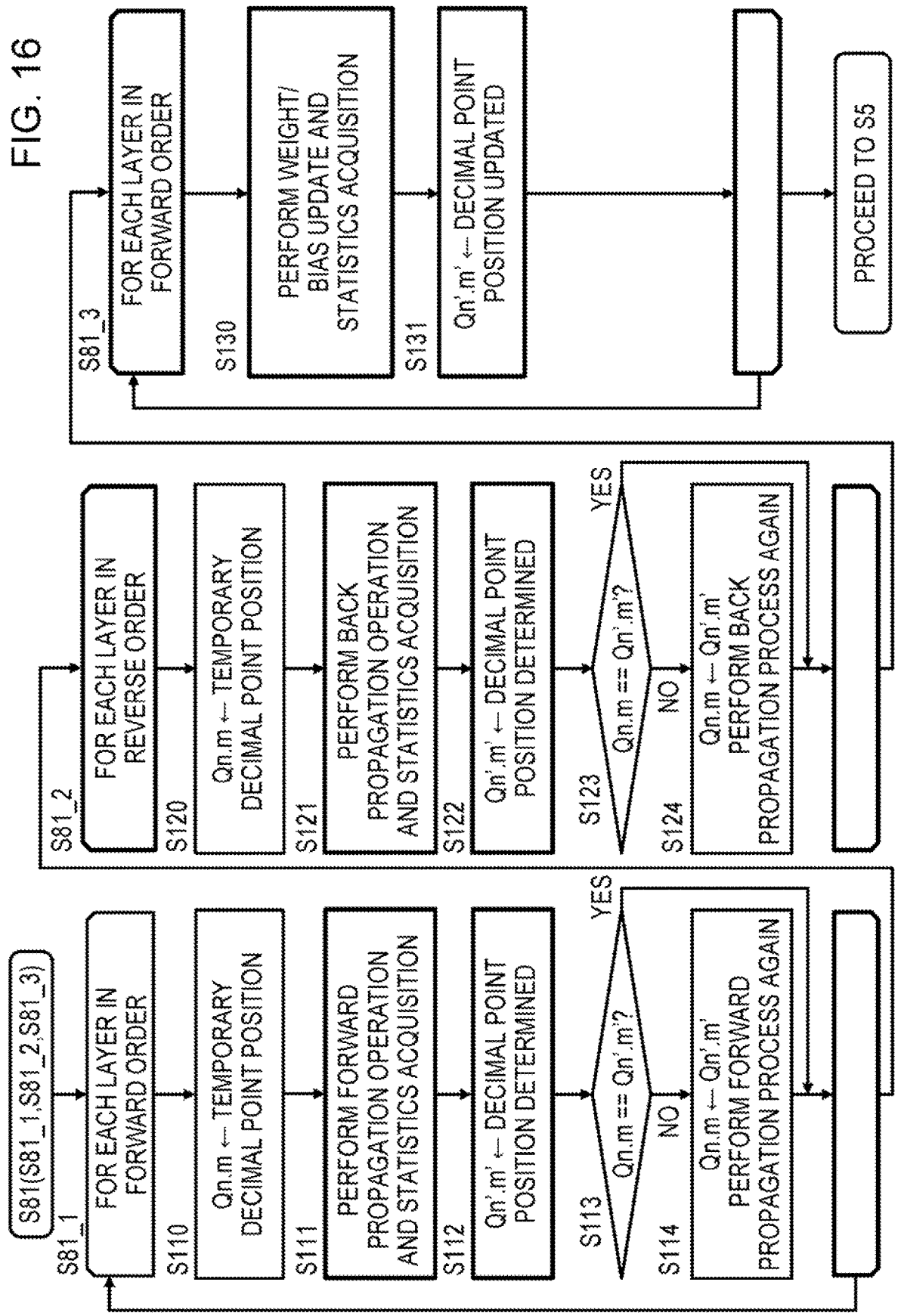

FIGS. 15 and 16 are diagrams illustrating detailed flowcharts of the pre-training according to the present embodiment. FIG. 15 illustrates details of the process of S80 of FIG. 9. FIG. 16 illustrates details of the processes of S81, S81_1, S81_2, and S81_3 of FIG. 9.

FIG. 15 illustrates the process of determining initial decimal point positions and converting into fixed-point numbers S80, the pre-training S81, and the training S5 in the deep learning. In the process of S80 (S80_1), input data given as initial values in the DNN, and parameters such as weights and biases of the respective layers are converted into fixed-point numbers. In order to do so, the host processor acquires the maximum value and the minimum value for each of the parameters such as input data, weights, and biases (S100), and determines the number of bits in the integer part such that the larger one of the absolute values of the maximum value and the minimum value is not saturated due to overflow (S101).

For example, when the larger absolute value is +2.25, $\log_2(2.25)=1.169925001$, and therefore, if the integer part is 2 bits, the maximum value is 0b11=3, so that the absolute value +2.25 will not overflow. That is, the initial decimal point position is determined in the format Q2.13 which has an integer part of 2 bits and a decimal part of 13 bits.

Then, the host processor converts each of the parameters, such as input data, weights, and biases, from the floating-point number to a fixed-point number in the determined format Qn.m (S102).

FIG. 16 illustrates detailed processes of the forward propagation process S81_1, the back propagation process S81_2, and the update process S81_3 of parameters such as the weights and biases of the respective layers in the pre-training S81. In the pre-training S81, the mini-batch training is performed once or several times.

In the forward propagation process S81_1, the fixed-point DNN processor repeats the following processes for each layer in the DNN in order. First, the DNN processor determines the temporary decimal point positions of the intermediate data of each layer as Qn.m (S110). The determination of the temporary decimal point position is, for example, the same manner as that for the decimal point position of the input data of each layer, etc. In the convolution layer, since the intermediate data is generated by adding a bias to a cumulative sum of values obtained by multiplying the input data by a weight, the above determination is considered effective as a temporary decimal point position of the intermediate data.

Next, the fixed-point DNN processor performs the forward propagation operation for the target layer, and acquires the statistical information of the intermediate data obtained by the arithmetic operation (S111). This forward propagation operation is as described with reference to FIG. 12. The forward propagation operation is preferably performed for training data of one mini-batch. However, the training data of one mini-batch may be divided such that the operation is performed several times. Alternatively, the operation may be performed for training data of two or more mini-batch. Then, the fixed-point DNN processor determines the optimal decimal point position Qn'.m' for each of the plurality of pieces of intermediate data based on the acquired statistical information of the pieces of intermediate data (S112). The process of determining the optimal decimal point position is as described with reference to FIGS. 13 and 14.

Furthermore, the fixed-point DNN processor compares the temporary decimal point position Qn.m with the determined decimal point position Qn'.m' (S113), and when they do not match (NO in S113), the decimal point position Qn.m is replaced with the determined decimal point position Qn'.m, and then the forward propagation process is performed again (S114). The intermediate data obtained in the forward propagation process S114 performed again is overwritten on the intermediate data obtained in the process of S111. By performing the forward propagation process with the determined decimal point position again, it is possible to enhance the accuracy of the intermediate data of the target layer. When the temporary decimal point position Qn.m matches the determined decimal point position Qn'.m' (YES in S113), the process of S114 is not performed.

The determination in S113 may be a determination as to whether or not the difference between the temporary decimal point position Qn.m and the determined decimal point position Qn'.m' is less than a threshold, rather than whether or not they match.

In the case where a plurality of pieces of intermediate data are obtained in the forward propagation process for each layer, the determination in S113 is preferably a determination suitable to enhance the accuracy of the forward propagation process, for example, a determination as to (1) whether or not the temporary decimal point positions match the determined decimal point positions for all the pieces of intermediate data (that is, whether or not those for at least one piece of intermediate data do not match), (2) whether or not the temporary decimal point positions match the determined decimal point positions for a predetermined number of pieces of Intermediate data, or (3) whether or not those for a specific piece of intermediate data match. Further, the determination in the above (1)-(3) of S113 may be a determination as to whether or not the difference between the temporary decimal point position Qn.m and the determined decimal point position Qn'.m' is less than a threshold, rather than whether or not they match.

The fixed-point DNN processor repeatedly performs the processes of S110 to S114 described above for each layer in the DNN in order. When the processes of S110 to S114 are performed for all the layers, the processor performs the back propagation process S81_2.

In the back propagation process S81_2, the fixed-point DNN processor repeats the following processes for each layer in the DNN in reverse order. The temporary decimal point positions of piece of intermediate data (a difference value such as an error or a weight) of each layer is determined as Qn.m (S120). The determination of the temporary decimal point position is, for example, the same manner as that for the decimal point position of the input data of each layer.

Next, the fixed-point DNN processor performs the back propagation operation for the target layer, and acquires the statistical information of the intermediate data obtained by the operation (S121). This back propagation operation is as described with reference to FIG. 12. The back propagation operation is also performed for the training data of one or several mini-batches. Then, the fixed-point DNN processor determines the optimal decimal point position Qn'.m' for each of the plurality of pieces of intermediate data based on the acquired statistical information of the pieces of intermediate data (S122).

Furthermore, the fixed-point DNN processor compares the temporary decimal point position Qn.m with the determined decimal point position Qn'.m' (S123), and when they do not match (NO in S123), the decimal point position Qn.m is replaced with the determined decimal point position Qn'.m', and then the back propagation process is performed again (S124). The intermediate data obtained in the back propagation process performed again is overwritten on the Intermediate data obtained in the process of S121. By performing the back propagation process with the determined decimal point position again, it is possible to enhance the accuracy of the intermediate data (difference values such as errors or weights) of the target layer. When they match (YES in S123), the process of S124 is not performed.

The determination S123 may be any one of the determinations (1) to (3) exemplified for the above determination S113. Whether or not they match may be determined by whether or not the difference between m and m' or n and n' is less than a threshold.

Next, the fixed-point DNN processor repeats the following processes for each layer in order. That is, the processor updates the weights and biases by adding the weight and the bias difference update value $\Delta W_{ij}$ and $\Delta b$ of each layer obtained in the back propagation process S81_2 to the original weight and bias, and acquires the statistical information of the updated weights and biases (S130). Then, the decimal point positions Qn'.m' of the updated weights and biases are determined and updated based on the statistical information (S131). When the update of parameters such as weights and biases of all the layers and the update of the decimal point positions thereof are completed, the pre-training ends, and then the processor proceeds to the training.

In the training, every time the mini-batch training is performed K times, the processor adjusts the decimal point positions of the intermediate data based on the statistical information acquired during the mini-batch training. The condition for adjusting the decimal point positions of the intermediate data in the training may be different from the condition for adjusting them in the pre-training (when the temporary decimal point position Qn.m does not match the determined decimal point position Qn'.m'. The condition may be, for example, the condition that the decimal point position before adjustment and the determined decimal point position are different from each other by equal to or greater than a predetermined threshold $r_{max}$.

Configuration of Fixed-Point DNN Processor and Acquisition of Statistical Information Next, the configuration of the fixed-point DNN processor and the acquisition of the statistical information according to the present embodiment will be described.

Figure 17:
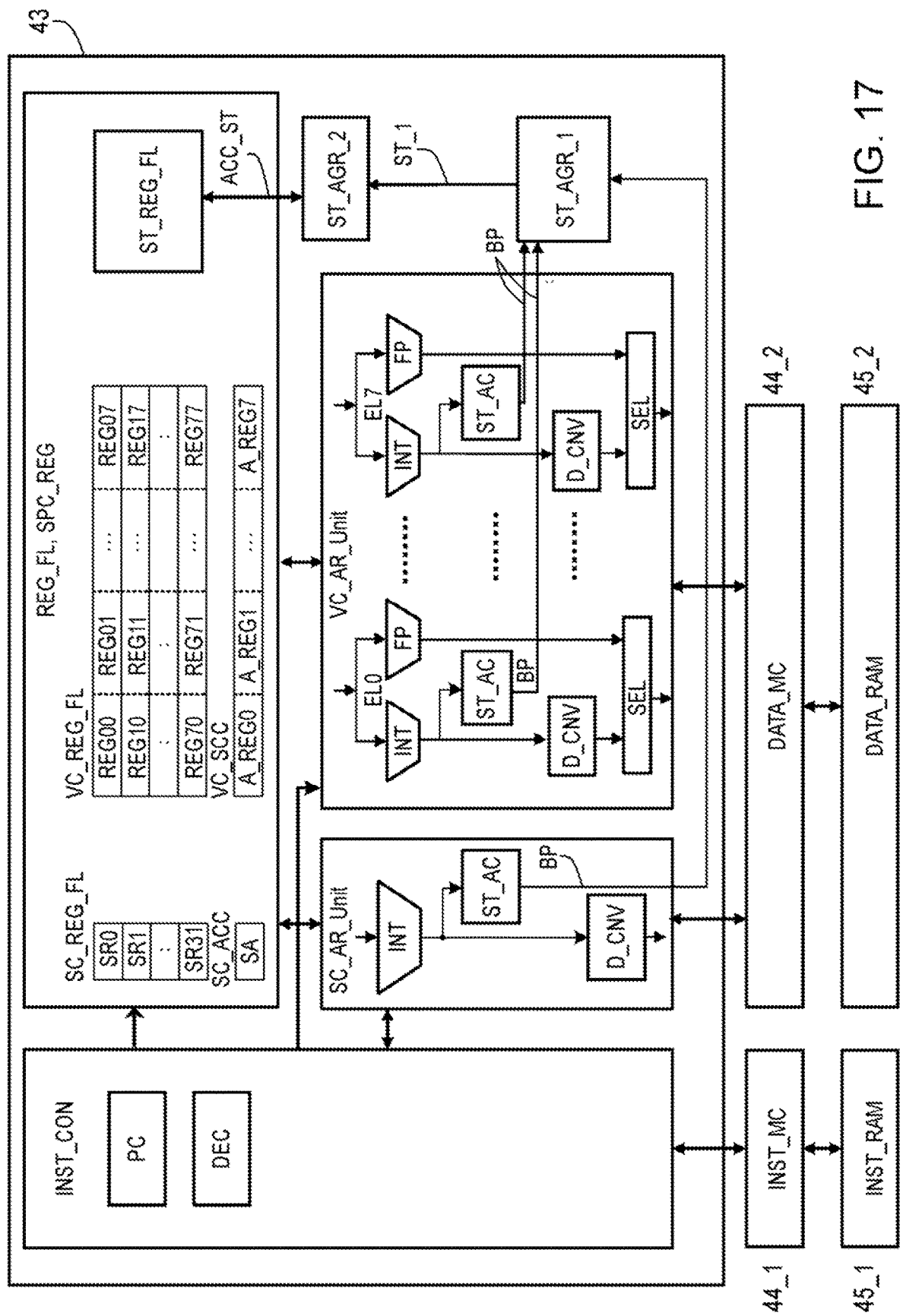
FIG. 17 is a diagram illustrating a configuration example of the DNN processor 43.

FIG. 17 is a diagram illustrating a configuration example of the DNN processor 43. The DNN processor or DNN operation processing device 43 includes an instruction control unit INST_CON, a register file REG_FL, a special register SPC_REG, a scalar arithmetic unit or circuit SC_AR_UNIT, a vector arithmetic unit or circuit VC_AR_UNIT, and statistical information aggregators or aggregation circuits ST_AGR_1 and ST_AGR_2.

In the DNN processor 43, the vector arithmetic unit includes integer arithmetic units or circuits INT that each operates a fixed-point number, and floating-point arithmetic units or circuits FP that each operates a floating-point number. In other words, the DNN processor 43 includes the fixed-point DNN processor 43_1 and the floating-point DNN processor 43_2.

Further, an instruction memory 45_1 and a data memory 45_2 are coupled to the DNN processor 43 via the memory access controller (MAC) 44. The MAC 44 includes an instruction MAC 44_1 and a data MAC 44_2.

The instruction control unit INST_CON includes, for example, a program counter PC and an instruction decoder DEC. The instruction control unit fetches an instruction from the instruction memory 45_1 by referring to the address of the program counter PC, decodes the fetched instruction by the instruction decoder DEC, and issues the decoded instruction to the arithmetic unit.

The register file REG_FL includes a scalar register file SC_REG_FL and a scalar accumulation register SC_ACC, which are used by the scalar arithmetic unit SC_AR_UNIT. The register file REG_FL also includes a vector register file VC_REG_FL and a vector accumulation register VC_ACC, which are used by the vector arithmetic unit VC_AR_UNIT.

The scalar register file SC_REG_FL includes, for example, 32-bit scalar registers SR0-SR31 and a 32+α-bit scalar accumulation register SC_ACC, for example.

The vector register file VC_REG_FL includes, for example, eight sets of registers REG00-REG07 to REG70-REG77 in which each set includes eight elements of 32-bit registers REGn0-REGn7. The vector accumulation register VC_ACC includes, for example, 32+α-bit registers A_REG0 to A_REG7, which are eight elements.

The scalar arithmetic unit SC_AR_UNIT includes a set of an integer arithmetic unit INT, a data converter D_CNV, and a statistical information acquisition unit or circuit ST_AC. The data converter converts output data of a fixed-point number output from the integer arithmetic unit INT into a floating-point number. The scalar arithmetic unit SC_AR_UNIT performs an arithmetic operation using the scalar registers SR0-SR31 and the scalar accumulation register SC_ACC in the scalar register file SC_REG_FL. For example, the integer arithmetic unit INT operates input data stored in any of the scalar registers SR0-SR31, and stores the output data in another register. When performing a product-sum operation, the integer arithmetic unit INT stores the result of the product-sum operation in the scalar accumulation register SC_ACC. The result of operation of the scalar arithmetic unit is stored in any one of the scalar registers, the scalar accumulation register, and the data memory 45_2.

The vector arithmetic unit VC_AR_UNIT includes eight elements of arithmetic units or circuits EL0-EL7. Each element of EL0-EL7 includes an integer arithmetic unit INT, a floating-point arithmetic unit FP, and a data converter D_CNV. The vector arithmetic unit receives, for example, input data in any set of eight-element registers REGn0-REGn7 in the vector register file VC_REG_FL, performs arithmetic operations in parallel with the eight-element arithmetic units, and stores the results of the arithmetic operations in another set of eight-element registers REGn0-REGn7.

The vector arithmetic unit also performs a product-sum operation with the eight-element arithmetic units, and stores the resulting cumulative sum of the product-sum operation in the eight-element registers A_REG0 to A_REG7 of the vector accumulation register VC_ACC.

In the vector registers REGn0-REGn7 and the vector accumulation registers A_REG0 to A_REG7, the number of operation elements Increases to 8, 16, or 32 depending on whether the number of bits of data to be operated is 32 bits, 16 bits, or 8 bits.

The vector arithmetic unit includes eight statistical information acquisition units, or circuits ST_AC that acquire the pieces of statistical information of output data from the eight-element integer arithmetic units INT, respectively. The statistical information is position Information of leftmost set bit for positive number or leftmost zero bit for negative number of the output data from the integer arithmetic units INT. The statistical information is acquired as a bit pattern described later with reference to FIG. 20. The statistical information acquisition unit ST_AC may be configured to receive not only the output data from the integer arithmetic unit INT but also data in the memory 45_2 and data in the scalar register or the scalar accumulation register, to acquire the statistical information.

Figure 23:
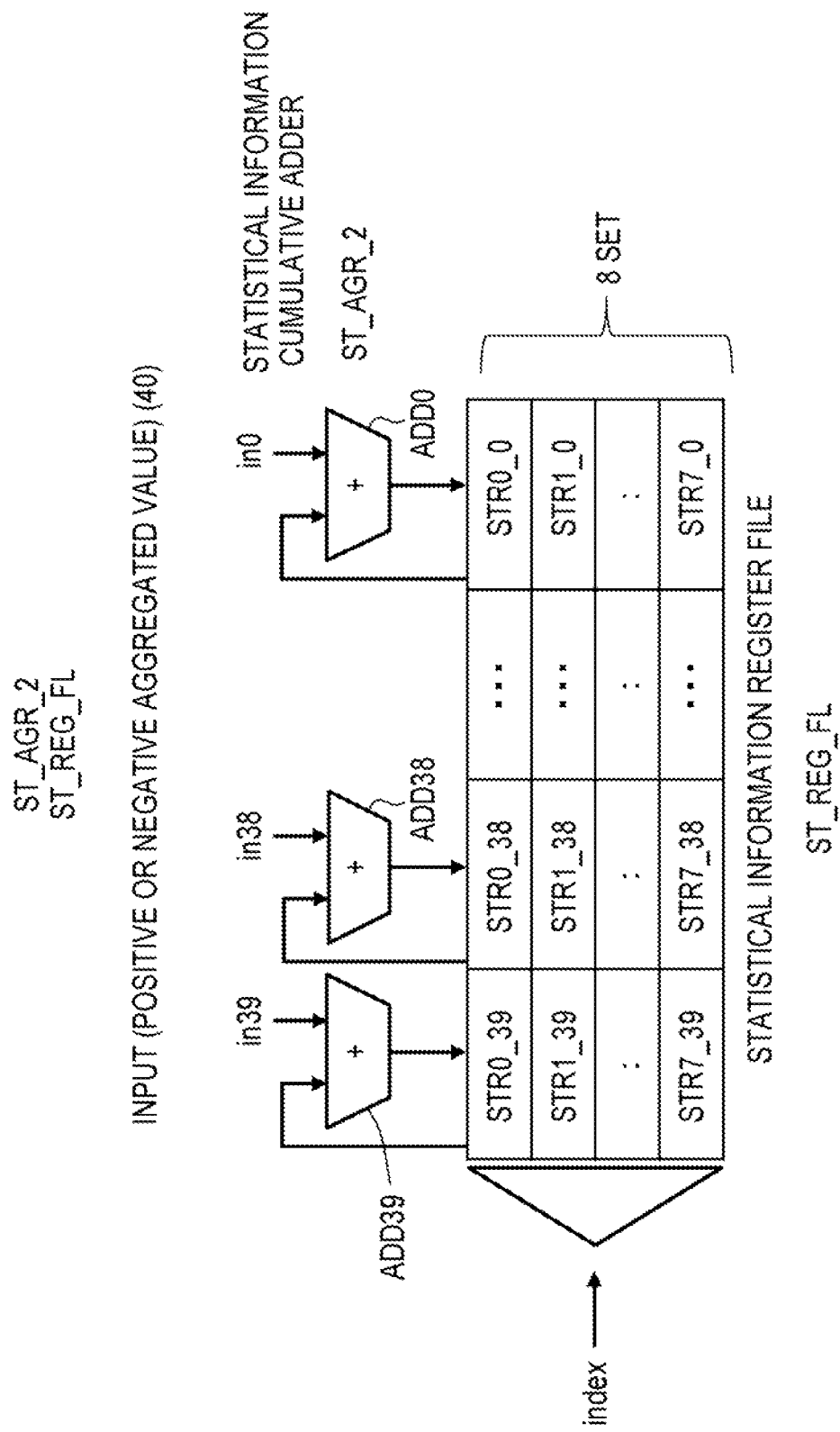
FIG. 23 is a diagram illustrating an example of the second statistical information aggregator ST_AGR_2 and the statistical information register file.

As illustrated in FIG. 23 described later, a statistical information register file ST_REG_FL includes, for example, eight sets of registers STR0_0-STR0_39 to STR7_0-STR7_39 in which each set includes statistical information registers STR0-STR39, which are 32 bits×40 elements.

The scalar registers SR0-SR31 store therein, for example, addresses and DNN parameters. The vector registers REG00-REG07 to REG70-REG77 store therein input data and output data of the vector arithmetic unit. The vector accumulation register VC_ACC stores therein a result of multiplication and a result of addition of the vector registers.

The statistical information registers STR0_0-STR0_39 to STR7_0-STR7_39 store therein a number of pieces of data belonging to a plurality of bins of at most eight types of histograms. In the case where the output data of the integer arithmetic unit INT is 40 bits, a number of pieces of data having the leftmost set bit for positive number or leftmost zero bit for negative number in each 40-bit are stored in, for example, the statistical information registers STR0_0-STR0_39.

The scalar arithmetic unit SC_AR_UNIT has functions of four type of arithmetic operations, shift operations, branches, loading/storing, and the like. As described above, the scalar arithmetic unit includes the statistical information acquisition unit ST_AC that acquires the statistical Information having the position of the leftmost set bit for positive number or leftmost zero bit for negative number from the output data of the integer arithmetic unit INT.

The vector arithmetic unit VC_AR_UNIT performs floating-point arithmetic operation, integer arithmetic operation, product-sum operation using a vector accumulation register, and the like. The vector arithmetic unit also performs clearing of the vector accumulation register, multiply-and-accumulate (MAC), accumulation addition, transferring to the vector register, and the like. Further, the vector arithmetic unit performs loading and storing. As described above, the vector arithmetic unit includes the statistical information acquisition unit ST_AC that acquires the statistical information having the position of the leftmost set bit for positive number or leftmost zero bit for negative number from the output data of the integer arithmetic unit INT of each of the eight elements.

Acquisition, Aggregation, Storage of Statistical Information

Next, acquisition, aggregation, and storage of statistical information of operation output data by the DNN processor will be described. Acquisition, aggregation, and storage of statistical information are instructions to be transmitted from the host processor, and are to be performed using an instruction performed by the DNN processor as a trigger. Accordingly, the host processor transmits instructions for acquiring, aggregating, and storing statistical information to the DNN processor in addition to the operation instructions for each layer in the DNN. Alternatively, the host processor transmits an instruction for operation including processes pf acquiring, aggregating, and storing statistical information to the DNN processor for operation of each layer.

Figure 18:
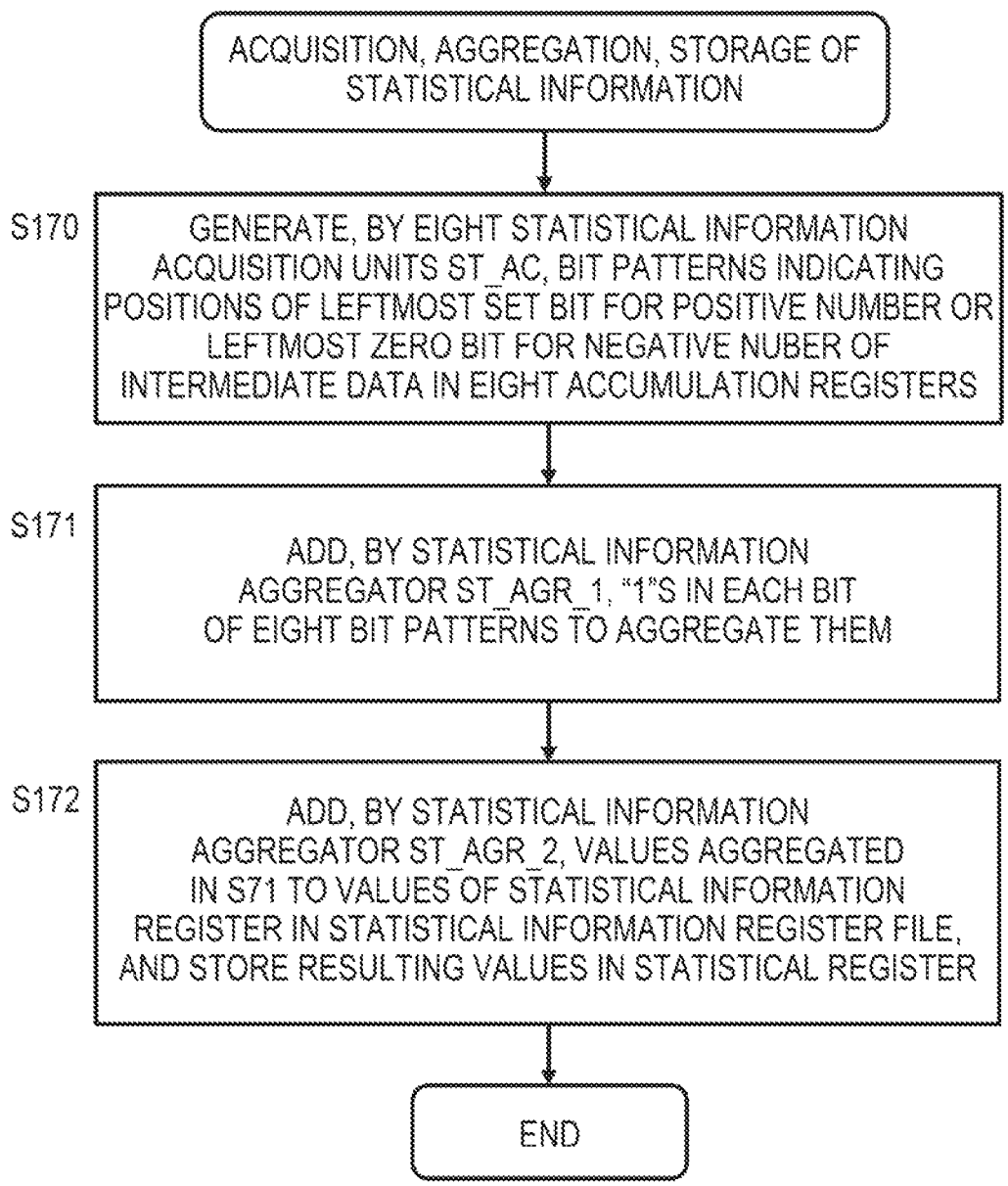
FIG. 18 is a flowchart illustrating the processes of acquiring, aggregating, and storing statistical information to be performed by the DNN processor.

FIG. 18 is a flowchart illustrating the processes of acquiring, aggregating, and storing statistical Information to be performed by the DNN processor. First, the eight statistical information acquisition units ST_AC in the vector arithmetic unit each output a bit pattern Indicating the position of the leftmost set bit for positive number or leftmost zero bit for negative number of a piece of intermediate data that the integer arithmetic unit INT (S170) output by performing the arithmetic operation of each layer. The bit pattern will be described later.

Next, the statistical information aggregator ST_AGR_1 adds "1"s in each bit of the eight bit patterns output by the eight INTs to aggregate them (S171).

Further, the statistical Information aggregator ST_AGR_2 adds the values obtained by the addition and aggregation in S171 to the values of the statistical information register in the statistical information register file ST_REG_FL, and stores the resulting values in the statistical information register (S172).

The processes of S170, S171, and S172 described above are repeatedly performed each time a piece of intermediate data, which is a result of the arithmetic operation for each layer performed by the eight elements EL0-EL7 in the vector arithmetic unit, is generated.

In the pre-training, when the processes of acquiring, aggregating and storing statistical information described above are completed for a plurality of pieces of intermediate data in one (or several) mini-batch, the statistical information, which indicates values of respective bins of the histogram of the leftmost set bit for positive number or leftmost zero bit for negative numbers of the pieces of intermediate data in one mini-batch, is generated in the statistical information register. As a result, the sum of the positions of the leftmost set bit for positive number or leftmost zero bit for negative number in the intermediate data in one mini-batch is obtained for each bit. Based on the statistical information, the decimal point position of each piece of intermediate data is adjusted.

On the other hand, in the training, statistical Information is acquired for a plurality of pieces of intermediate data in K mini-batches, and the decimal point position of each piece of intermediate data is adjusted based on the acquired statistical Information.

Acquisition of Statistical Information

Figure 19:
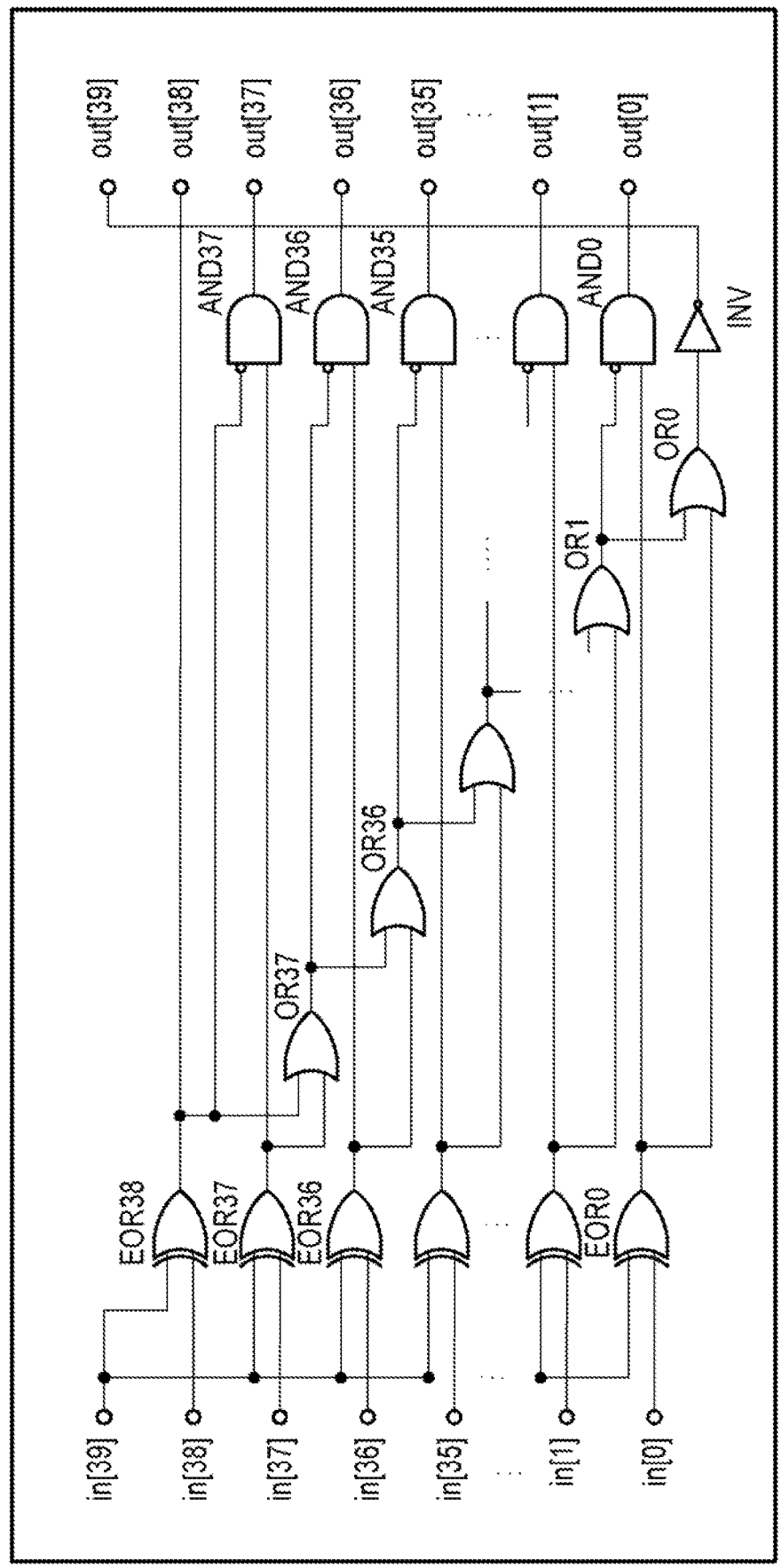
FIG. 19 is a diagram illustrating a logic circuit example of the statistical information acquisition unit ST_AC.
Figure 20:
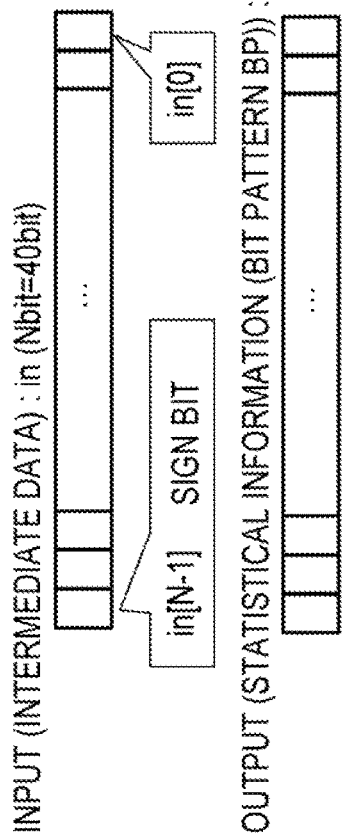
FIG. 20 is a diagram illustrating bit patterns of operation output data acquired by the statistical information acquisition unit.

FIG. 19 is a diagram Illustrating a logic circuit example of the statistical information acquisition unit ST_AC. FIG. 20 is a diagram illustrating bit patterns of operation output data acquired by the statistical information acquisition unit. The statistical information acquisition unit ST_AC receives an input of an N-bit (N=40) intermediate data, in[39:0] output from the integer arithmetic unit INT (for example, operation output data of convolution arithmetic operation in the forward propagation process, an update difference of an error or a weight in the back propagation process), and outputs a bit pattern output out[39:0] in which the position of the leftmost set bit for positive number or leftmost zero bit for negative number is indicated by "1" and the other bits are indicated by "0".

As illustrated in FIG. 20, the statistical information acquisition unit ST_AC outputs, as a bit pattern, the output out[39:0] in which "1" is set for the position of the leftmost set bit for positive number or leftmost zero bit for negative number (1 or 0 different from the sign bit) and "0" is set for other positions for the input in[39:0] that is a piece of intermediate data. However, when all the bits of the input in[39:0] are the same as the sign bit, the most significant bit out[39] is exceptionally set to "1". FIG. 22 illustrates a truth table of the statistical information acquisition unit ST_AC.

According to the truth table, the first two lines are examples in which all the bits of the input in[39:0] match the sign bit of "1" or "0", and their most significant bit out[39] of the output out[39:0] is "1" (0x8000000000). The next two lines are examples in which the 38th bit in[38] of the input in[39:0] is different from the sign bit of "1" or "0", and the 38th bit out[38] of the output out[39:0] is "1" and the other bits are "0". The last two lines are examples in which the 0th bit in[0] of the input in[39:0] is different from the sign bit of "1" or "0", and the 0th bit out[0] of the output out[39:0] is "1" and the other bits are "0".

The logic circuit Illustrated in FIG. 19 detects the position of the leftmost set bit for positive number or leftmost zero bit for negative number as follows. First, when the sign bit in[39] and the bit in[38] do not match, the output of an EOR38 becomes "1" and the output out[38] becomes "1". When the output of the EOR38 becomes "1", the other outputs out[39] and out[38:0] become "0" through logical sums OR37-OR0, logical products AND37-AND0, and an inverting gate INV.

When the sign bit in[39] matches in[38] but does not match in[37], the output of the EOR38 becomes "0", the output of an EOR37 becomes "1", and the output out[37] becomes "1". When the output of the EOR37 becomes "1", the other outputs out[39:38] and out[36:0] become "0" through logical sums OR36-OR0, logical products AND36-AND0, and an inverting gate INV. The same applies hereinafter.

As can be understood from FIGS. 19 and 20, the statistical information acquisition unit ST_AC outputs, as a bit pattern, distribution information including the position of the most significant bit of "1" or "0" that is different from the sign bit (leftmost set bit for positive number or leftmost zero bit for negative number) of a piece of intermediate data which is the operation output.

Aggregation of Statistical Information

Figure 21:
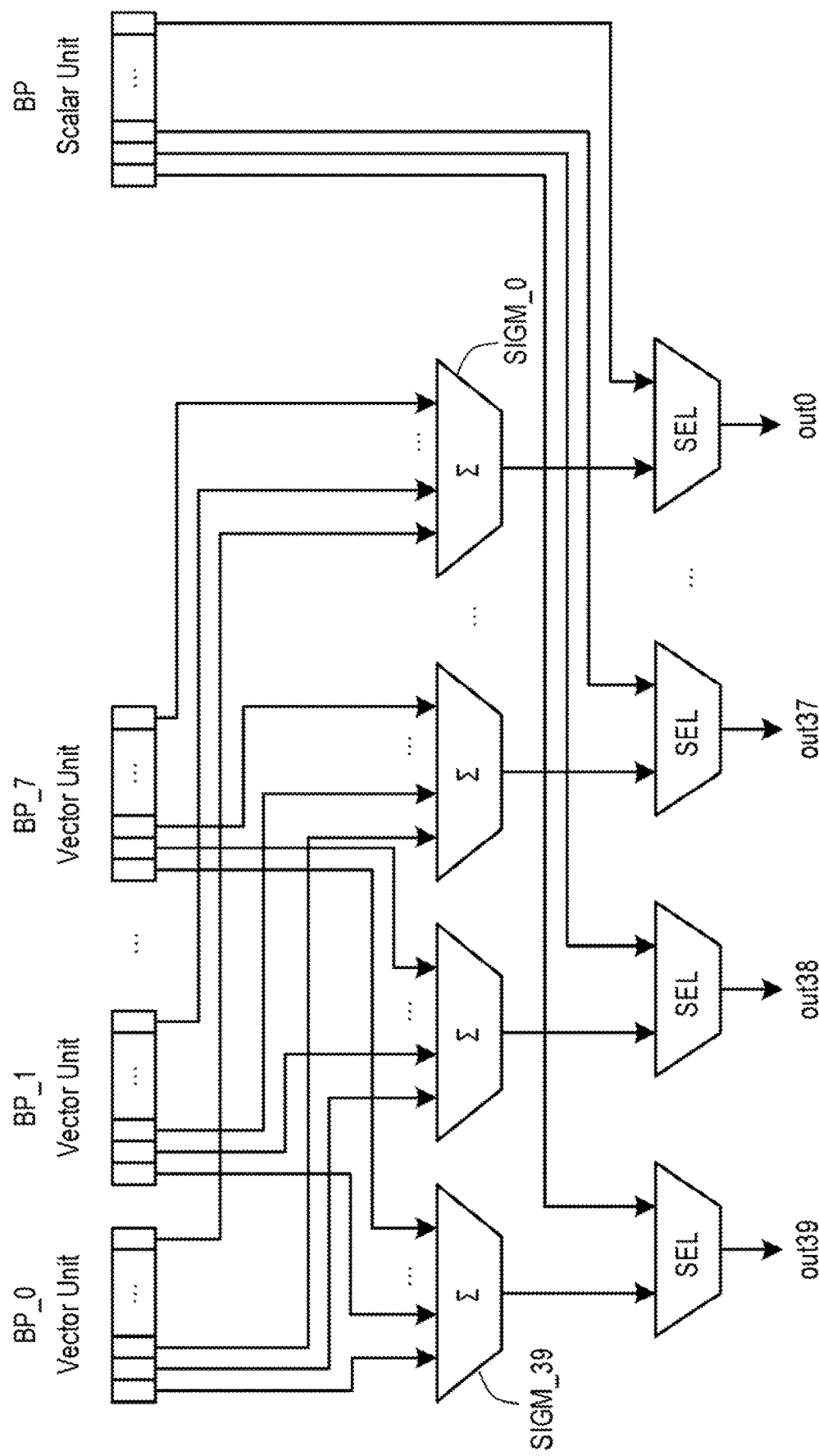
FIG. 21 is a diagram illustrating a logic circuit example of the statistical information aggregator ST_AGR_1.

FIG. 21 is a diagram illustrating a logic circuit example of the statistical information aggregator ST_AGR_1. FIG. 22 is a diagram describing the operation of the statistical information aggregator ST_AGR_1. The statistical information aggregator ST_AGR_1 receives an input of eight statistical information, bit patterns BP_0 to BP_7, acquired by the vector arithmetic unit, and outputs out0 to out39 obtained by adding "1" in each bit of the eight bit patterns. The bit patterns BP_0 to BP_7 are each 40 bits, and out0 to out39 are each 4 bits, for example.

As illustrated in the logic circuit of FIG. 21, the statistical Information aggregator ST_AGR_1 inputs "1" in each bit of the bit patterns BP_0 to BP_7, which are acquired by the statistical information acquisition circuits ST_AC of the vector arithmetic unit, to the corresponding one of addition circuits SGM_0-SGM_39, and outputs the results of addition as outputs out0 to out39. The outputs out0 to out39 are each indicated as an output illustrated in FIG. 22. Each output has $\log_2$ (number of elements=8)+1 bits so that the number of elements having "1" can be counted for each of 40 bits, and when the number of elements having "1" is 8, each output of out[39:0] has 4 (=3+1) bits.

The statistical information aggregator ST_AGR_1 can output one bit pattern BP acquired by the statistical information acquisition circuit ST_AC in the scalar arithmetic unit as it is. For this purpose, selectors SEL that each select either the corresponding output of the addition circuits SGM_0-SGM_39 or the bit pattern of the scalar arithmetic unit are provided.

FIG. 23 is a diagram illustrating an example of the second statistical information aggregator ST_AGR_2 and the statistical information register file ST_REG_FL. The second statistical information aggregator ST_AGR_2 adds the values of the outputs out0 to out39, which have been aggregated to correspond to the respective bits by the first statistical information aggregator ST_AGR_1, to the values of one register set STRn_39 to STRn_0 in the statistical information register file ST_REG_FL to be stores.

The statistical information register file ST_REG_FL includes, for example, eight sets of 40 32-bit registers STRn_39 to STRn_0 (n=0 to 7). Thus, the statistical information register file ST_REG_FL can store therein eight types of histograms each having a number of 40 bins. Assume that the statistical information to be aggregated is stored in 40 32-bit registers STR0_39 to STR0_0 where n=0. The second statistical information aggregator ST_ARG_2 includes adders ADD_39 to ADD_0 that adds each of the aggregated values in[39:0] aggregated by the first statistical information aggregator ST_AGR_1 to the corresponding one of the cumulative addition values stored in the 40 32-bit registers STR0_39 to STR0_0. The outputs of the adders ADD_39 to ADD_0 are re-stored in the 40 32-bit registers STR0_39 to STR0_0, respectively. As a result, the sampled numbers in the bins of the target histogram are stored in the 40 32-bit registers STR0_39 to STR0_0.

With the hardware circuitry of the statistical information acquisition unit or circuit ST_AC and the statistical Information aggregators or aggregation circuits ST_AGR_1 and ST_AGR_2 provided in the arithmetic unit or circuit illustrated in FIGS. 17, 19, 21, and 23, the distribution (the sampled numbers in the bins of the histogram) of the positions of the leftmost set bit for positive number or leftmost zero bit for negative number (the positions of the most significant bits of the valid bits) of the intermediate data that is operated in each layer in the DNN can be acquired.

With the hardware circuitry of the DNN processor, the distribution of the positions of the non-zero least significant bits as well as the distribution of the positions of the leftmost set bit for positive number or leftmost zero bit for negative number can be acquired in the same manner as described above. In addition, the maximum value of the positions of the leftmost set bit for positive number or leftmost zero bit for negative number and the minimum value of the positions of the non-zero least significant bits can be acquired in the same manner.

Since the statistical information can be acquired by the hardware circuitry of the DNN processor, adjustment of the decimal point positions of the intermediate data in the pre-training and adjustment of the decimal point positions of the intermediate data in the training can be achieved with a slight increase in man-hours.

Second Embodiment

In the pre-training of the present embodiment, the decimal point positions of intermediate data such as weights and biases in the DNN are temporarily determined; the statistical information of the intermediate data is acquired while performing the mini-batch training once or several times; the decimal point positions of the intermediate data are set to the optimal positions based on the statistical information; and the mini-batch training is performed again with the same training data.

Since the pre-training is performed at the initial stage of the deep learning, the decimal point position adjusted by the adjustment of the decimal point position based on the statistical information may change in a relatively large fluctuation range. A large fluctuation range due to the adjustment of the decimal point position means that an overflow or underflow has occurred in the fixed-point number obtained by the arithmetic process with at the decimal point position before the adjustment.

Therefore, in the second embodiment, it is determined in the pre-training whether or not the fluctuation range due to the adjustment of the decimal point position is greater than an allowable range. If the fluctuation range is larger, the mini-batch training is performed again. The pre-training is repeatedly performed until the number of repetitions of the mini-batch training for each layer in the DNN reaches at a predetermined threshold.

Figure 24:
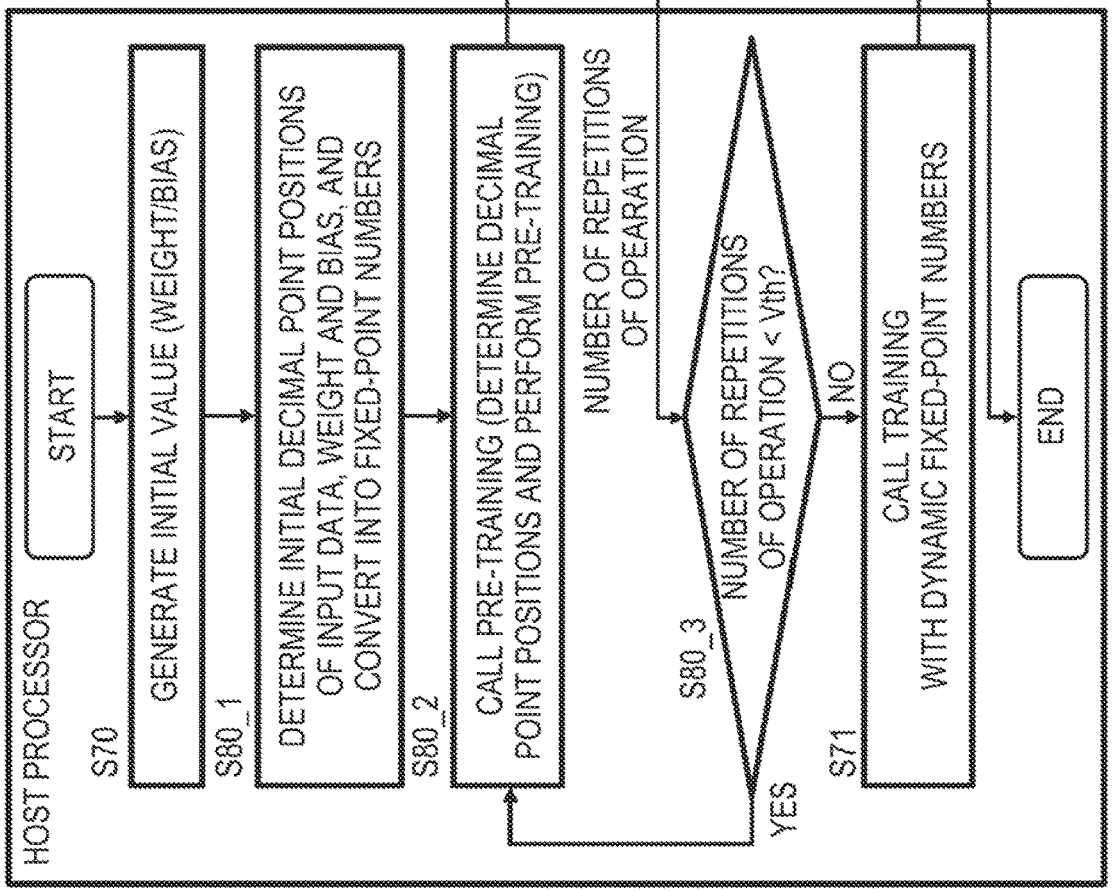
FIG. 24 is a diagram illustrating a flowchart of the deep learning by a plurality of processors according to the second embodiment.

FIG. 24 is a diagram illustrating a flowchart of the deep learning by a plurality of processors according to the second embodiment. The same processes as those in FIG. 10 are denoted by the same process numbers.

First, the host processor 31 generates initial values of parameters such as weights and biases in the DNN (S70). The initial values are floating-point numbers. Next, the host processor determines the initial decimal point positions of input data and intermediate data including parameters such as weights and biases, and converts the initial decimal point positions into fixed-point numbers (conversion into fixed-point numbers) (S80_1). Since the input data and the parameters are floating-point numbers, the host processor determines the optimal fixed-point positions based on the exponent part or based on the maximum value and the minimum value.

Then, the host processor 31 calls the pre-training program for the fixed-point DNN processor (S80_2), and in response to this, the fixed-point DNN processor 43_1 performs the pre-training (S81). The pre-training by the fixed-point arithmetic operation includes, for example, performing the mini-batch training once or several times, and includes the processes of S81_1, S81_2, and S81_3 in FIG. 9. The pre-training is also performed using dynamic fixed-point numbers, and the decimal point positions of the pieces of intermediate data are determined or adjusted based on the statistical Information.

In the second embodiment, the DNN processor 43_1 transmits, to the host processor, the number of repetitions of the mini-batch training performed when the fluctuation range of the decimal point position determined in the pre-training S81 is out of a predetermined allowable range. When the number of repetitions of the mini-batch training is less than a predetermined threshold, the host processor calls the pre-training program again (S80_2). In response to this, the DNN processor 43_1 performs the pre-training again (S81). On the other hand, when the number of repetitions of the mini-batch training reaches at the predetermined threshold, the host processor calls the training program for the fixed-point DNN processor (S71). In response to this, the fixed-point DNN processor 43_1 performs the training using dynamic fixed-point numbers (S5). When the number of repetitions of the mini-batch training is less than the predetermined threshold, which means that the fluctuation range of the decimal point position of the intermediate data has decreased, the pre-training ends and then the processing proceeds to the training.

The condition for whether or not to update the decimal point position in the training, may be such that a difference between the decimal point position before the adjustment and the decimal point position determined based on the statistical information is equal to or greater than a predetermined allowable value $r_{max}$. The condition for whether or not to update the decimal point position in the pre-training may be such that the difference is equal to or greater than a predetermined allowable value $r_{max}'$ different from that for the training.

Figure 25:
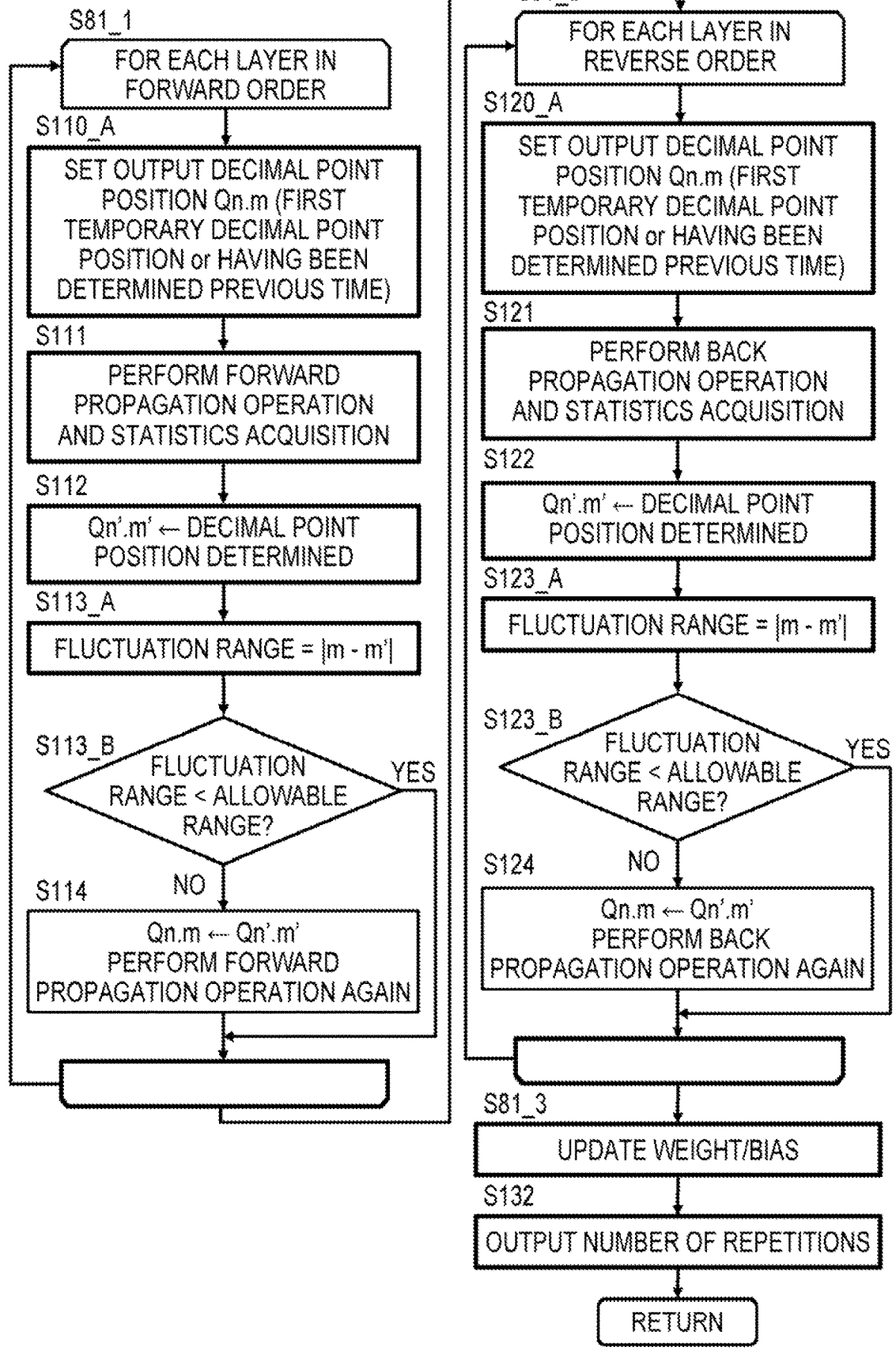
FIG. 25 is a diagram illustrating a detailed flowchart of the forward propagation process and the back propagation process in the pre-training according to the second embodiment.

FIG. 25 is a diagram illustrating a detailed flowchart of the forward propagation process and the back propagation process in the pre-training according to the second embodiment. FIG. 25 corresponds to FIG. 16 described above, and the same processes are denoted by the same process numbers. In FIG. 25, the forward propagation process and the back propagation process of FIG. 16 are partly improved. In FIG. 25, processes of S110_A, S113_A, and S113_B in the forward propagation process S81_1, and processes of S120_A, S123_A, and S123_B in the back propagation process 81_2 are different from those in FIG. 16, and the other processes are the same as those in FIG. 16. Hereinafter, the processes different from FIG. 16 will be described.

The DNN processor performs the forward propagation process for each layer in order (S81_1). The DNN processor determines the temporary decimal point positions Qn.m of intermediate data, such as parameters such as weights and biases in the DNN and output data of each layer, in the first pre-training, and sets the decimal point position Qn.m, which has been determined the previous time, in the second and subsequent pre-trainings (S110_A).

After the forward propagation operation and statistical acquisition S111 and the determination of the decimal point position Qn'.m' S112 based on the statistical information, the DNN processor sets the fluctuation range of the decimal point position before and after the determination to |m−m'| (S113_A), and determines whether the fluctuation range is less than the allowable value ($r_{max}'$) (S113_B). If the fluctuation range is not less than the allowable value (NO in S113_B), the DNN processor updates the decimal point position Qn.m to the adjusted decimal point position Qn'.m', and performs the forward propagation process operation again (S114). Conversely, if the fluctuation range is less than the allowable value (YES in S113_B), the decimal point position Qn.m is not changed and the forward propagation process operation is not performed again. After finishing the forward propagation process S81_1, the processing proceeds to the back propagation process S81_2.

The processes of S120_A, S123_A, and S123_B in the back propagation process S81_2 are the same as the processes of S110_A, S113_A, and S113_B in the forward propagation process.

The DNN processor adds the difference update values of the parameters such as weights and biases obtained in the back propagation process for each layer in order, thereby updating the weights and biases (S81_3). Then, the DNN processor outputs the number of repetitions of the operations performed in the forward propagation process and the back propagation process to the host processor (S132).

As described above, according to the present embodiment, the fixed-point processor performs the pre-training, and determines the decimal point position of the fixed-point number of predetermined data based on the statistical information of the data. Then, in the training, the fixed-point processor performs the mini-batch training a plurality of times with the fixed-point number of the fixed-point position determined in the pre-training. Even in the training, the decimal point position of the fixed-point number of the predetermined data is dynamically adjusted based on the statistical information of the data. Therefore, it is not necessary for the pre-training to use a floating-point processor, and thus power consumption by the floating-point processor can be suppressed. Further, when there is no need to perform other floating-point number arithmetic operations, the hardware of the floating-point processor can be reduced.

According to the present embodiment, in the pre-training, the decimal point position of the data is determined based on the statistical information of the data in the arithmetic operations for each layer in the forward propagation process and the arithmetic operations for each layer in the back propagation process in the DNN, and the arithmetic operations for each layer are performed again with the determined decimal point position if the difference between the temporary decimal point position determined at the beginning of the pre-training and the determined decimal point position is equal to or greater than the allowable value. This makes it possible to enhance the accuracy of the arithmetic operations for the subsequent layers.

According to the embodiments, it is possible to perform the pre-training with high accuracy by the fixed-point arithmetic operation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An information processing apparatus that performs deep learning using a neural network, the information processing apparatus comprising:
a memory; and
an arithmetic processing device being able to access the memory, wherein the arithmetic processing device performs a process for a plurality of layers of the neural network in a predetermined direction,
the process for at least one layer of the plurality of layers includes:
(a) determining a first decimal point position for setting a first range for storing a plurality of pieces of second data in a register;
(b1) performing a fixed-point arithmetic operation on a plurality of pieces of first data by the arithmetic processing device to acquire the plurality of pieces of second data based on the first decimal point position,
(b2) storing, in the register, a plurality of first values included in the first range of the plurality of pieces of the second data;
(b3) generating statistical information based on each of the plurality of pieces of the second data;
(c) determining, based on the statistical information, a second decimal point position for setting a second range for storing the plurality of pieces of the second data in the register;
(d) determining whether a difference between the first decimal point position and the second decimal point position exceeds a threshold value;
(e1) when the difference does not exceed the threshold value,
(e1-1) outputting the first value stored in the register as a result value of the fixed-point arithmetic operation of the at least one layer; and
(e2) when the difference exceeds the threshold value,
(e2-1) performing again the fixed-point arithmetic operation on the plurality of pieces of the first data based on the second decimal point position,
(e2-2) storing, in the register, a plurality of second values included in the second range of the plurality of pieces of the second data, which are obtained by performing again the fixed-point arithmetic operation on the plurality of pieces of the first data, and
(e2-3) outputting the second values stored in the register as the result of the fixed-point arithmetic operation of the at least one layer.

2. The information processing apparatus according to claim 1, wherein, the generating the statistical information includes generating the statistical information based on information about a distribution of positions of leftmost set bit for positive number or positions of leftmost zero bit for negative number of each of the plurality of pieces of the second data.

3. A method of performing deep learning by performing a process for a plurality of layers of a neural network in a predetermined direction, wherein the process for at least one layer of the plurality of layers includes:
(a) determining a first decimal point position for setting a first range for storing a plurality of pieces of second data in a register;
(b1) performing a fixed-point arithmetic operation on a plurality of pieces of first data by the arithmetic processing device to acquire the plurality of pieces of second data based on the first decimal point position,
(b2) storing, in the register, a plurality of first values included in the first range of the plurality of pieces of the second data;
(b3) generating statistical information based on each of the plurality of pieces of the second data;
(c) determining, based on the statistical information, a second decimal point position for setting a second range for storing the plurality of pieces of the second data in the register;
(d) determining whether a difference between the first decimal point position and the second decimal point position exceeds a threshold value;
(e1) when the difference does not exceed the threshold value,
(e1-1) outputting the first value stored in the register as a result value of the fixed-point arithmetic operation of the at least one layer; and
(e2) when the difference exceeds the threshold value,
(e2-1) performing again the fixed-point arithmetic operation on the plurality of pieces of the first data based on the second decimal point position,
(e2-2) storing, in the register, a plurality of second values included in the second range of the plurality of pieces of the second data, which are obtained by performing again the fixed-point arithmetic operation on the plurality of pieces of the first data by, and
(e2-3) outputting the second values stored in the register as the result of the fixed-point arithmetic operation of the at least one layer.

4. A non-transitory computer-readable storage medium storing therein a program causing a computer to execute deep learning by performing a process for a plurality of layers of a neural network in a predetermined direction, the process for at least one layer of the plurality of layers comprising:
(a) determining a first decimal point position for setting a first range for storing a plurality of pieces of second data in a register;
(b1) performing a fixed-point arithmetic operation on a plurality of pieces of first data by the arithmetic processing device to acquire the plurality of pieces of second data based on the first decimal point position,
(b2) storing, in the register, a plurality of first values included in the first range of the plurality of pieces of the second data;
(b3) generating statistical information based on each of the plurality of pieces of the second data;
(c) determining, based on the statistical information, a second decimal point position for setting a second range for storing the plurality of pieces of the second data in the register;
(d) determining whether a difference between the first decimal point position and the second decimal point position exceeds a threshold value;
(e1) when the difference does not exceed the threshold value,
(e1-1) outputting the first value stored in the register as a result value of the fixed-point arithmetic operation of the at least one layer; and
(e2) when the difference exceeds the threshold value,
(e2-1) performing again the fixed-point arithmetic operation on the plurality of pieces of the first data based on the second decimal point position,
(e2-2) storing, in the register, a plurality of second values included in the second range of the plurality of pieces of the second data, which are obtained by performing again the fixed-point arithmetic operation on the plurality of pieces of the first data, and (e2-3) outputting the second values stored in the register as the result of the fixed-point arithmetic operation of the at least one layer.

\* \* \* \* \*